(12) United States Patent
O'Brien

(10) Patent No.: US 10,974,950 B2
(45) Date of Patent: Apr. 13, 2021

(54) SYSTEM AND METHOD FOR DISTRIBUTING AND DISPENSING LIQUIDS

(71) Applicant: Packaging Innovation Limited, London (GB)

(72) Inventor: Michael Gerard O'Brien, London (GB)

(73) Assignee: PACKAGING INNOVATION LIMITED, London (GB)

( * ) Notice: Subject to any disclaimer, the term of this patent is extended or adjusted under 35 U.S.C. 154(b) by 0 days.

(21) Appl. No.: 16/448,789

(22) Filed: Jun. 21, 2019

(65) Prior Publication Data

US 2019/0389634 A1 Dec. 26, 2019

(30) Foreign Application Priority Data

Jun. 25, 2018 (GB) .................................... 1810402.6
Apr. 10, 2019 (GB) .................................... 1905097.0

(51) Int. Cl.
*B67D 3/00* (2006.01)
*B65D 47/14* (2006.01)
(Continued)

(52) U.S. Cl.
CPC ......... *B67D 3/0093* (2013.01); *B65D 47/142* (2013.01); *B65D 51/18* (2013.01);
(Continued)

(58) Field of Classification Search
CPC .. B67D 3/0093; B67D 3/0064; B67D 7/0205; B67D 7/0288; B65D 47/142;
(Continued)

(56) References Cited

U.S. PATENT DOCUMENTS

| 1,967,358 A | 7/1934 | Gianelloni |
| 3,078,471 A * | 2/1963 | Knibb ..................... B05B 9/002 |
| | | 4/517 |

(Continued)

FOREIGN PATENT DOCUMENTS

| CN | 202928655 U | 5/2013 |
| DE | 202010004532 U1 | 7/2010 |

(Continued)

OTHER PUBLICATIONS

Examination Report for United Kingdom Patent Application No. GB1810402.6, dated Apr. 16, 2019, 7 pages.

(Continued)

*Primary Examiner* — Lien M Ngo

(74) *Attorney, Agent, or Firm* — Withrow & Terranova, P.L.L.C.

(57) ABSTRACT

The invention relates to a system for distributing and dispensing liquids, the system comprising a plurality of re-usable containers, each container comprising a removable closure arranged to engage with a neck of the container, the closure comprising a liquid flow passage extending through the closure; and a dip tube fluidly connected to or forming the liquid flow passage of the closure and extending into the container. The system further comprises a dispensing assembly comprising a dispensing pump, a dispensing tube fluidly connected to the dispensing pump, and a connector arranged to releasably engage with the closure so as to fluidly connect the dispensing tube to the liquid flow passage of the closure. The removable closure is a tamper-proof or tamper-evident closure, arranged to deter or prevent removal of the closure by an unauthorised person. A method for distributing and dispensing liquids using the inventive system is further provided. A further aspect relates to a hand-held displace- (Continued)

ment pump for use with the system and method of the present invention.

10 Claims, 11 Drawing Sheets

(51) Int. Cl.
*B65D 51/18* (2006.01)
*B65D 51/16* (2006.01)

(52) U.S. Cl.
CPC ............ *B67D 3/0064* (2013.01); *B65D 51/16* (2013.01); *B65D 2251/1016* (2013.01)

(58) Field of Classification Search
CPC ................... B65D 51/18; B65D 51/16; B65D 2251/1016; Y02W 30/805
USPC ... 222/541.5, 382, 320, 321.1, 321.7, 321.3, 222/153.01, 163.06, 153.09; 215/254, 215/255, 274
See application file for complete search history.

(56) References Cited

U.S. PATENT DOCUMENTS

| | | | |
|---|---|---|---|
| 3,850,329 A * | 11/1974 | Robinson | ........... B65D 41/3404 215/254 |
| 4,949,878 A | 8/1990 | Jacobi | |
| 5,186,365 A | 2/1993 | Nolte | |
| 5,478,015 A | 12/1995 | Black | |
| 7,647,653 B1 * | 1/2010 | Catania | ................ A47K 5/1202 4/628 |
| 9,497,953 B2 * | 11/2016 | Mitchell | ................ A01C 15/02 |
| 2007/0267381 A1 * | 11/2007 | Schmidt | ............. B65D 41/3495 215/252 |

FOREIGN PATENT DOCUMENTS

| | | |
|---|---|---|
| EP | 0056295 A1 | 7/1982 |
| EP | 0142966 A1 | 5/1985 |
| GB | 291128 A | 5/1928 |
| GB | 2158906 A | 11/1985 |
| JP | S60166824 A | 8/1985 |
| WO | 9721596 A1 | 6/1997 |
| WO | 03095953 A1 | 11/2003 |
| WO | 2011147978 A1 | 12/2011 |
| WO | 2013168065 A1 | 11/2013 |

OTHER PUBLICATIONS

Examination Report for United Kingdom Patent Application No. GB1810402.6, dated Jun. 25, 2019, 5 pages.
Combined Search and Examination Report for United Kingdom Patent Application No. GB1905097.0, dated Oct. 7, 2019, 9 pages.
Search Report under Section 17 for United Kingdom Patent Application No. GB2011853.5, dated Sep. 14, 2020, 1 page.
Combined Search and Examination Report under Sections 17 and 18(3) for United Kingdom Patent Application No. GB2011853.5, dated Sep. 15, 2020, 2 pages.

* cited by examiner

SYSTEM AND METHOD FOR DISTRIBUTING AND DISPENSING LIQUIDS

CROSS-REFERENCE TO RELATED APPLICATIONS

This application claims priority to United Kingdom Patent Application No. 1810402.6 filed on Jun. 25, 2018, and to United Kingdom Patent Application No. 1905097.0 filed on Apr. 10, 2019, wherein the contents of the foregoing applications are hereby incorporated by reference herein in their respective entireties.

TECHNICAL FIELD

The present invention relates to a system and method for distributing and dispensing liquids, wherein containers for storing and transporting liquids can be reused a number of times, with minimal processing of the containers being required between uses and with minimal wastage of material.

BACKGROUND

The supply of liquids for industrial and/or commercial applications, such as concentrated chemical cleaning systems, requires the liquid to be stored in appropriate containers for distribution from the supplier to the user. Reusability of such containers is becoming an increasingly pressing issue, as the supplier (or whoever is responsible for placing the container into the market) is becoming increasingly responsible for the entire lifecycle of the container. Thus, it is desirable for the supplier to retrieve empty containers from the user, such that the container can be refilled and redistributed. This reduces the number of used containers being sent to landfill or being recycled and thus has obvious environmental benefits.

A problem arises from the fact that the supplier has little or no control over how a container is used whilst in the possession of a user. It is possible that the container may be used for other purposes, such as to store and/or transport liquids other than the liquid originally supplied in the container. Furthermore, the container may be used carelessly leading to contamination of the container. For example, the container may be left uncovered (e.g. with a cap of the container removed), thus introducing the possibility of liquids or other contaminants entering the container.

Since the supplier has little or no control over the use of the container, when processing the container for reuse the supplier must decontaminate the container by washing, rinsing or otherwise removing residual liquid from the container before the container can be refilled and redistributed. This creates a significant burden on the supplier and increases the costs involved with reusing containers. Furthermore, the necessary processing can be energy intensive, and thus the environmental benefits of reusing containers are diminished. Still further, when decontaminating container, the supplier must ensures that waste chemicals are appropriately disposed of. These factors reduce the motivation for suppliers to reuse containers.

It is an object of the present invention to provide a system and method for distributing and dispensing liquids, in which containers used to store and transport the liquids can be returned to a supplier after use, and subsequently refilled and redistributed by the supplier within minimal processing of the containers by the supplier being required before reuse, and with minimal wastage of material.

SUMMARY

According to a first aspect of the present invention there is provided a system for distributing and dispensing liquids, the system comprising a plurality of re-usable containers, each container comprising a removable closure arranged to engage with a neck of the container, the closure comprising a liquid flow passage extending through the closure; and a dip tube fluidly connected to or forming the liquid flow passage of the closure and extending into the container. The system further comprises a dispensing assembly comprising a dispensing pump, a dispensing tube fluidly connected to the dispensing pump, and a connector arranged to releasably engage with the closure so as to fluidly connect the dispensing tube to the liquid flow passage of the closure. The removable closure is a tamper-proof or tamper-evident closure, arranged to deter or prevent removal of the closure by an unauthorised person.

Within the context of this specification, including the appended claims, the terms "tamper-proof closure" and "tamper-evident closure" are to be construed as follows.

The term "tamper-proof closure" refers to a closure which is arranged to engage with the container so as to prevent removal of the closure from the container by an unauthorised person. For example, a "tamper-proof closure" may be engaged with the neck of a container by a locking mechanism, requiring a specific tool to remove the closure. Such a tool may only be available to the supplier, meaning that only the supplier is able to remove the closure, and a user is not able to remove the closure when the container is in their possession. The term "tamper-evident closure" refers to a closure which is removable from the container by any person, however any such removal is immediately evident. Thus, it can readily be determined if the closure has been removed.

A system in accordance with the present invention permits a supplier to distribute a filled container to a user. Upon receipt of the container, the user can install the container into a dispensing assembly at the user premises by simply engaging the connector of the dispensing assembly with the closure, so as to fluidly connect the interior of the container to the dispensing pump without the need to first remove the closure. When the connector of the dispensing assembly is connected to the closure, a flow path is provided from the interior of the container, through the dip tube, the liquid flow passage of the closure, and the dispensing tube, to the dispensing pump. Activation of the dispensing pump thereby allows liquid to be drawn out from the container and to be dispensed by the dispensing pump. Preferably, the dispensing tube is a flexible tube which is at least partially external to both the container and the dispensing pump.

Such an arrangement obviates the need for the user to open the container by removing the closure prior to use, either to subsequently pour liquid out of the container or to insert a dispensing assembly into the container for subsequent dispensing of the liquid. This prevents liquid from being spilled, which avoids waste and may be particularly beneficial where the liquid is corrosive or otherwise hazardous. Importantly, the container may remain closed by the closure at all times when in the user's possession, since there is no need for the user to remove the closure in order to dispense liquid from the container.

When the amount of liquid within the container falls to a predetermined level, for example when the container is empty or substantially empty, the connector of the dispensing assembly can be removed from the closure and the container returned to the supplier for reuse. Since the closure of each container is either tamper-proof or tamper-evident, the closure cannot be removed by the user, without the supplier at least being aware of the fact that the closure has been removed, or that an attempt has been made to remove the closure. Accordingly, when the supplier receives a container returned by a user, the supplier is able to determine whether or not the closure has been removed, or whether any attempt to remove the closure has been made. The supplier can therefore determine whether or not it is possible that any liquids other than the liquid originally supplied in the container have entered the container whilst in the user's possession.

If it is determined that the closure has not been removed, or that no attempt to remove the closure has been made, the supplier can remove the closure and refill the container with the same liquid, without the need to first rinse or wash the container, or in any other way remove any residual liquid from the container.

Where the closure is a tamper-proof closure, the closure cannot be removed by the user and the supplier can therefore infer that the closure has not been removed at any point whilst in the user's possession. Where the closure is a tamper-evident closure, any removal of the closure or any attempt to remove the closure whilst in the user's possession will be evident to the supplier when the container is returned. In such a scenario, the supplier cannot be certain that the container has not be used to store other liquids, or contaminated in any other way, whilst in the user's possession. Thus, the container must be washed or otherwise decontaminated before being reused, or alternatively disposed of altogether.

The present invention therefore provides a system which enables a supplier to identify which containers need reprocessing before reuse, and which containers can be reused without requiring any processing, and can therefore be immediately refilled and redistributed. In practice, it is envisaged that the majority of containers will not have been tampered with, and therefore can be immediately reused.

The system thereby reduces costs and environmental impact by obviating the need to clean containers in between uses in the majority of cases. Furthermore, even where it becomes necessary to dispose of components of the system, all waste material, such as plastic waste, is in the control of the supplier, who can ensure that the waste is properly processed and disposed of. This obviates the need for the user to dispose of waste containers after use, who may lack the appropriate facilities to properly process and dispose of the waste material.

When the container is connected to the dispensing assembly, liquid can be drawn out from the container through the dip tube and the liquid flow passage of the closure. A dispensing operation will cause a reduction in pressure within the container as a result of the withdrawn liquid. In order for the pressure within the container to equilibrate after withdrawal of liquid, the closure preferably comprises a vent in order to allow air to be drawn into the container to replace the withdrawn liquid.

In preferred embodiments of the present invention, the vent comprises a vent valve provided in the closure, which vent valve is moveable between an open position and a closed position, the vent valve being biased to the closed position, and the connector comprises means to move the vent valve from the closed position to the open position when the connector is engaged with the closure. According to this arrangement, the vent valve remains closed unless and until the connector of a dispensing assembly is engaged with the closure. Thus, during storage and transportation, the container remains sealed and the ingress or egress of any fluid or contaminant to/from the container through the vent valve is prevented. When the connector of a dispensing assembly is engaged with the closure, the vent valve is concurrently moved into the open position, allowing air to be drawn into the container through the vent to replace any withdrawn liquid.

Preferably, the liquid flow passage comprises a liquid valve moveable between an open position and a closed position, the liquid valve being biased to the closed position, and the connector comprises means to move the liquid valve from the closed position to the open position when the connector is engaged with the closure. In the same manner described above with respect to the vent valve, the liquid flow passage is therefore closed by the liquid valve unless and until the connector of a dispensing assembly is engaged with the closure. Thus, during storage and transportation, the container remains sealed and the ingress or egress of any fluid or other contaminant to/from the container through the liquid valve is prevented. When the connector of a dispensing assembly is engaged with the closure, the liquid valve is concurrently moved into the open position, allowing liquid to be withdrawn from the container through the liquid flow passage by the dispensing assembly.

In preferred embodiments of the present invention, the vent comprises a vent valve provided in the closure, the liquid flow passage comprises a liquid valve, and the container comprises no openings, apertures or any other means by which liquid can enter or exit the container other than an opening defined by the neck of the container. Accordingly, the container is sealed by the closure when the closure is engaged with the neck of the container. Unless and until the closure is engaged with the connector of a dispensing assembly, the liquid valve and the vent valve remain in the closed positon and thus the ingress or egress of fluid or any other contaminant into the container though closure is prevented. The closure therefore acts as a stand-alone cap for the container, which completely closes the container without the need for any other cap to seal any openings of the container and/or closure.

A further advantage of this arrangement is that the liquid valve and vent valve can only be opened by a connector which is designed specifically for the closure, such that it comprises appropriate means for opening the liquid valve and the vent valve. Thus, when the container is in the possession of a user, the valves can only be opened when the container is connected to a dispensing assembly via the connector of the dispensing assembly. This prevents the container from being filled with any other liquid through the liquid flow passage and/or vent of the closure when in the user's possession, whether accidental or intentional.

Preferably, the liquid valve and the vent valve each comprise a substantially planar upper surface arranged to be substantially flush with an upper surface of the closure when biased to the closed position, and the upper surfaces of the liquid valve, vent valve and closure form a substantially continuous barrier to prevent the ingress or egress of liquid from the container when the valves are in the closed position. Accordingly, when disengaged from a connector of a corresponding dispensing assembly, the closure is sealed and thus forms a stand-alone cap for the container, without the need for any other cap or cover. That the upper surfaces of the liquid valve and vent valve are substantially flush with the upper surface of the closure provides the advantage that there are no parts which protrude above the upper surface of the closure, which could become damaged during storage and/or transportation. Further, the surfaces of the valves are not recessed from the upper surface of the closure, meaning that no wells or indentations are formed in the upper surface of the closure, where liquid may undesirably collect.

Alternative embodiments of the present invention may comprise a closure having a liquid flow passage and/or a vent which is in a permanently open configuration. Such embodiments may further comprise a cap arranged to engage with the closure so as to seal the liquid flow passage and/or vent when the closure is not engaged with a connector of a dispensing assembly. The cap may therefore be attached to the closure when the container is being stored and transported, so as to prevent ingress or egress of fluid to/from the container. The cap may preferably be tethered or otherwise attached to the container, such that it remains connected to the container even when disengaged from the closure. Accordingly, the cap cannot be misplaced whilst the container is in use.

The liquid flow passage and/or the vent may preferably have a size, shape and/or configuration which restricts liquid from entering the container through the liquid flow passage and/or vent, such that it is not practical for a user to attempt to refill the container with another fluid through the liquid flow passage and/or vent. This arrangement is particularly important where the closure comprises a liquid flow passage and/or a vent which is in a permanently open configuration.

The system may further comprise a frame assembly, the frame assembly comprising an enclosure arranged to accommodate a container in a fixed position and orientation. The frame assembly thereby provides a convenient means for locating a container at a user premises in a position in which it can readily be engaged with the dispensing assembly. The frame assembly further comprises a pivotable arm, wherein the connector of the dispensing assembly is attached to a free end of the pivotable arm, and wherein the pivotable arm is moveable between a lowered position where the connector may be connected to the container, and a raised position where the connector is not connected to the container. The dispensing tube is arranged such that when the connector is in the raised position, liquid in the dispensing tube will not be able to drain out through the connector. Installation of a new container is thereby simplified. When no container is installed, the free arm can be pivoted into the raised position, and thus the connector can be stored in the raised position. Accordingly, any residual liquid within the dispensing tube is prevented from draining out through the connector onto a floor or work surface.

Preferably, the dispensing pump is a hand-held dispensing pump and the dispensing tube is a flexible tube arranged to fluidly connect the dispensing pump to the liquid flow passage of the closure, and the frame assembly further comprises a cradle for releasably mounting the dispensing pump, the cradle being physically connected to a portion of the frame assembly, such that the cradle is positioned at a fixed height relative to the enclosure of the frame assembly. Accordingly, when a container is installed, the dispensing pump can be stowed in a position in which the outlet of the dispensing pump is raised relative to the container, such that liquid is prevented from draining out from the dispensing pump when the system is not in use. Similarly, when no container is installed, and when the pivotable arm is in the raised position, the dispensing pump can be stowed in a position in which the outlet of the dispensing pump is lower than the connector, such that liquid does not drain out through the connector. The dispensing pump is preferably provided with one or more non-return valve to prevent liquid from draining out of the dispensing assembly through the dispensing pump.

In some embodiments, the closure is a tamper-proof closure arranged not to be removable from the container by hand, wherein a tool is required to remove the tamper-proof closure. For example, in some embodiments, the closure may be arranged to engage with the neck of the container by means of a screw thread, and the closure may be tightened onto the neck of the container to a torque which is greater than can be applied by a human hand, thus requiring a tool to remove. Alternatively, the closure may be secured to the container using magnetically-releasable engagement means, which again requires a tool to remove. Preferably, the closure requires the use of a tool which is specifically designed to remove the closure, such that the closure can only be removed using said specifically-designed tool. Such a specifically-designed tool is therefore unlikely to be available to any person other than the supplier, thus preventing any person other than the supplier (or a person authorised by the supplier) from removing the closure.

In preferred embodiments, the container comprises a tamper-evident closure, which comprises a closure body arranged to engage with a neck of a container so as to seal an opening of said container, and a closure ring separate from and unattached to the closure body, wherein the closure ring is arranged to engage with both the closure body and the container neck so as to prevent the closure body from being removed from the container neck until the integrity of the closure ring has been destroyed in a manner which prevents the ring from being reused. In order to remove the closure body from the container neck, the closure ring must first be broken in order to disengage from both the closure body and the container neck. Whilst the closure ring is intact and engaged with both the closure body and the container neck, the closure ring prevents the closure body from being removed from the container neck.

According to such an arrangement, the supplier will be readily able to determine if the closure has been removed whilst the container has been in the user's possession, since the closure ring will necessarily have been broken. In such a scenario, the supplier cannot be certain that the no other liquids or other contaminants have been placed in the container, and thus the supplier may either decontaminate the container prior to reuse, or may dispose of the container altogether.

Conversely, if the supplier receives a returned container with the closure ring intact, the supplier can be certain that the closure has not been removed at any stage, and thus that no other liquids or other contaminants have entered the container whilst in the user's possession. Thus, the supplier can remove the closure by first removing the closure ring in a manner which prevents the ring from being reused (e.g. by breaking the ring at a point around its circumference), and subsequently disengaging the closure body from the container neck. Once the closure has been removed, the container can be refilled with the same liquid, without the need to first rinse, wash or in any other way remove any residual liquid from within the container. The same or an identical closure body can be engaged with a new closure ring, which itself is engaged with the container. The refilled container can then be redistributed to the same or another user.

Since the closure ring is separate from and unattached to the closure body, only the closure ring need be replaced in order to reuse the entire container. The amount of material that needs to be sent to waste is therefore minimised. Containers according to the present invention can thus be reused many times before needing to be replaced, reducing the cost of the system for both supplier and distributor, and reducing the environmental impact of the system, since far less material needs to be sent to landfill or recycled. Furthermore, more complex and expensive components of the system such as the closure body, which may comprise valves as described above, can also be reused a number of times.

Preferably, the closure body comprises an annular wall arranged to engage with said container neck by means of a screw thread, and the closure ring comprises a first set of engagement means arranged to engage with a second set of engagement means provided around the circumference of said container neck at a base thereof, which two sets of engagement means form a ratchet mechanism when engaged with each other, so as to permit rotation of the closure ring in a first rotational direction, and to prevent rotation of the closure ring in a second rotational direction opposing the first direction, the first rotational direction being a rotational direction in which the closure body is tightened onto the screw thread.

According to this arrangement, in order to fit the closure to the container, the closure ring can be engaged with the closure body, and the entire closure can then be screwed onto the container neck until the closure ring engages with the base of the container neck via the cooperating engagement means. Alternatively, the closure ring can first be placed around the container neck such that it engages with the base of the container neck via the cooperating engagement means, and the closure body can subsequently be screwed onto the container neck until the closure body engages with the closure ring. In either case, the ratchet mechanism formed by the cooperating engagement means of the closure ring and the container neck allow the closure ring to rotate around the container neck in the first rotational direction whilst the closure body is being tightened onto the container neck. However, the ratchet mechanism prevents the closure ring from rotating in the second rotational direction, which opposes the first rotational direction, when engaged with the container neck. When the closure ring is engaged with the closure body, movement of the closure body is transmitted to the closure ring. Whilst the closure body is being tightened onto the container neck, movement of the closure body and closure ring in the first rotational direction is permitted. However, the closure body is prevented from being rotated in the second rotational direction by the closure ring, which rotation would be necessary in order to remove the closure body from the closure neck. Therefore, once the closure ring is engaged with both the closure body and the container neck, it is not possible to remove the closure body from the container neck without first breaking the closure ring. Removal (or attempted removal) of the closure body will thereby be evident.

It will be appreciated that alternative arrangements of the tamper-evident closure may be employed without departing from the scope of the present invention. For example, the closure body, closure ring and container neck may engage by means of push-fit or clip-lock fittings. The closure ring may comprise a resilient push-fit fitting arranged to engage with a flange provided around the neck of the container, such that once engaged, the closure ring cannot be subsequently removed from the container neck without destroying the closure ring. Similarly, the closure ring may comprise a resilient push-fit fitting arranged to engage with a flange provided around the closure body, such that once engaged, the closure body cannot be subsequently disengaged from the closure ring, without destroying the closure ring. Thus, when all three components are engaged, the closure body cannot be removed from the container neck without first destroying the integrity of the closure ring in a manner which prevents the closure ring from being reused.

The closure ring preferably comprises a predefined weakness provided at a point around the circumference of the closure ring. Accordingly, if sufficient force is applied to the closure body when engaged with the closure ring, the closure ring will break at the predefined weakness, thus permitting the closure body to be removed from the container neck. Thus, where such a force is applied to the closure body, resulting wear or damage to the container neck caused by the concurrent force exerted on the container neck by the closure ring is limited. The predefined weakness also facilitates removal of the closure ring by the supplier (to allow the closure body to be removed from the container neck for subsequent refilling of the container), since the closure ring can be more easily broken and removed.

In some preferred embodiments, the closure ring comprises a protrusion adjacent the predefined weakness, the protrusion being arranged to protrude outwardly from a container neck on which the closure ring is placed, so that it may be used to release the closure ring and permit the closure body to be subsequently removed from the container neck without damaging the closure body. The protrusion may provide a tab to be manually pulled so as to break the closure ring. Alternatively, or additionally, the protrusion may be arranged to engage with a machine part or tool to enable the machine part or tool to release the closure ring and permit the closure body to be subsequently removed without damaging the closure body. For example, the protrusion may comprise a loop arranged to engage with a hook or rod of the machine part or tool. The machine part or tool may be a machine part of a production line for automatic processing of a plurality of returned containers, for example on a conveyor, or may be a hand-operated tool for manual removal of the closure ring.

Preferably, the closure body and the closure ring comprise a plurality of engaging teeth and/or recesses for engaging the closure ring with the closure body. Teeth of the closure ring may be arranged to be received within recesses formed between teeth of the closure body, and teeth of the closure body may be arranged to be received within recessed formed between teeth of the closure ring. Accordingly, the closure ring and the closure body are arranged to interlock, such that rotational movement of either the closure ring or the closure body is transmitted to the other.

According to a second aspect of the present invention, there is provided a hand-operated displacement pump comprising a flexible dispensing tube arranged to fluidly connect the displacement pump to an outlet of a liquid container, and further comprising a hand grip provided on an outer surface of the displacement pump. The dispensing tube is at least partially external to both the container and the dispensing pump. A hand-operated displacement pump according to the second aspect of the present invention may be connected to a container so as to allow liquid to be withdrawn from the container by operation of the pump, whilst the pump can be conveniently held by a user and moved relative to the container to which it is connected by virtue of the flexible dispensing tube. Accordingly, the user may hold the pump by the hand grip with a first hand, move the pump to the location of a receptacle into which liquid is to be dispensed (said location being within the reach of the flexible dispensing tube), and operate the pump with a second hand to dispense liquid from the container into the receptacle. This provides a safe and convenient means for a user to dispense liquid from the container. For example, where the receptacle is relatively large and difficult to hold with a single hand, the receptacle can be placed on the floor or on an appropriate work surface before liquid is dispensed. By virtue of the flexible dispensing tube, the container itself need not be in an immediately accessible location, and thus may be placed in an out-of-the-way location, such as under a work surface or mounted to a wall, provided the dispensing pump remains accessible to the user. The hand grip further provides an indication that the displacement pump is intended and arranged to be held in use.

Preferably, the hand-operated displacement pump comprises a chamber fluidly connected to the dispensing tube at a first end of the chamber, and a piston partially received within the chamber through a second end of the chamber, the piston comprising a pump head through which liquid is to be dispensed, wherein the hand grip is provided on an outer surface of the chamber. The displacement pump is operated by a user pressing downwardly on the piston so as to displace liquid held within the chamber through the pump head.

Preferably, a portion of the hand grip is contoured to accommodate fingers of a user holding the pump by the hand grip. The hand grip thereby provides an ergonomic means for the user to hold the displacement pump. The position of the contours may be arranged to encourage the user to hold the displacement pump in a particular orientation when dispensing liquid. For example, the displacement pump may comprise a pump head having a spout extending radially from a central axis of the displacement pump in a substantially fixed direction, and the hand grip comprises a contoured portion on a side of the dispensing pump facing the same direction as the spout. Accordingly, the user is encouraged to hold the displacement pump in an orientation in which the spout points away from the user.

The hand-operated displacement pump may preferably comprise a first non-return valve biased to a closed position in which the flow of liquid in an upstream direction from the dispensing tube to the displacement pump is prevented, and arranged to move into an open position in which the flow of liquid in said upstream direction is permitted. Accordingly, when connected to a container, if the displacement pump is left in a position lower than the level of liquid within the container, liquid is prevented from draining out of the container through the dispensing tube. For example, where the container is mounted in a raised position such as on a wall, a user may intentionally or unintentionally leave the pump hanging from the container by the dispensing tube, or may place the displacement pump on a work surface which is lower than the level of liquid within the container. In such a scenario, liquid within the container will drain out of the container through the dispensing tube under gravity. Provision of the first non-return valve within the displacement pump prevents this.

In order for liquid to be drawn from the container during or after a dispensing operation, the first non-return valve can be moved into an open position in which liquid is allowed to flow in an upstream direction from the dispensing tube to the displacement pump. Preferably, the first non-return valve is arranged to move into said open position under the action of a reduced pressure created within the displacement pump as a result of a dispensing operation.

The first non-return valve is preferably biased to a closed position by a spring, and wherein the spring has a predefined stiffness sufficient to bias the first non-return valve into the closed position and to allow the first non-return valve to move into the open position under the force of liquid acting on the first non-return valve in said upstream direction due to a reduced pressure created within the displacement pump as a result of a dispensing operation.

The first non-return valve may be provided within a connecting portion of the displacement pump, the connecting portion being arranged to fluidly connect the dispensing tube to an inlet of the chamber of the displacement pump. The connecting portion may be separate to a main body of the displacement pump, such that the connecting portion can be readily replaced in case of failure of the first non-return valve.

Preferably, the hand-operated displacement pump comprises a second non-return valve arranged to prevent the flow of liquid in a downstream direction from the displacement pump to the dispensing tube, wherein the second non-return valve is positioned upstream of the first non-return valve.

According to a third aspect of the present invention, there is further provided a system for distributing and dispensing liquids according to the first aspect of the present invention, wherein the dispensing pump is a hand-operated displacement pump according to the second aspect.

In a fourth aspect of the present invention, there is provided a method of distributing and dispensing liquids using a system according to the first aspect of the present invention, the method comprising:

at a supplier end:
  filling a first container of the plurality of containers with liquid to be distributed;
  fitting one of the removable closures to the neck of said first container, with the dip tube fluidly connected to the liquid flow passage of the closure and extending into said first container; and
  distributing said first container to a user, at a user end:
  receiving said first container distributed by said supplier;
  connecting the connector of the dispensing assembly to the closure of said first container;
  dispensing liquid from said first container using the dispensing pump;
  when the volume of liquid within the first container has fallen to a predetermined level, disconnecting the connector from the closure of said first container;
  replacing said first container with a second identical container received from said supplier; and
  returning said first container to said supplier, and at the supplier end:
  receiving said first container returned by said user;
  determining whether the tamper-proof or tamper-evident closure has been removed from said first container, or whether an attempt to remove the tamper-proof or tamper-evident closure has been made;
  if it is determined that the tamper-proof or tamper-evident closure has not been removed from said first container, or if it is determined that no attempt to remove the tamper-proof or tamper-evident closure has been made, removing said closure from the neck of said first container and refilling said first container with the same liquid without first rinsing, washing or in any other way removing any residual liquid from within the container;
  fitting the same or an identical removable closure to the neck of said first container with the dip tube fluidly connected to the liquid flow passage of the closure and extending into said first container; and
  redistributing said first container to the same or another user.

The fourth aspect of present invention provides a method by which containers for storing and transporting liquids, such as cleaning chemicals, may be reused with minimal processing required by the supplier between uses. In an initial use, the container is filled and distributed to a user, who installs the container within a dispensing assembly provided at a user end (i.e. at a user premises). The user is able to dispense liquid from the container using the dispensing assembly, without the need to remove the closure of the container. Accordingly, the user has no need to remove the closure. The user is thus deterred or prevented from removing the closure. Whilst the closure remains on the container, insertion of any other liquids into the container is severely restricted and preferably prevented.

When the supplier receives a returned container, the supplier can determine whether or not the closure has been removed by virtue of the tamper-proof or tamper-evident closure. Thus, where it is determined that the closure has not been removed by the user, or that no attempt to remove the closure has been made, the supplier can infer that the container has not been filled with any other liquids, or otherwise contaminated, whilst in the possession of the user. The container can therefore be refilled with the same liquid, and redistributed to the same or another user without the need to first clean the container.

Where the system used to execute the method according to the third aspect comprises a tamper-evident closure, the method preferably comprises:

in the step of fitting the removable closure to the neck of said first container, in no particular order: placing the closure ring of said closure around the neck of said first container, and fitting the closure body of said closure to the neck of said first container with the closure ring engaging with or engaged with the closure body; and in the step of removing the closure, removing the closure ring from the neck of said container in a manner which prevents the closure ring being reused, so as to disengage said closure ring from said neck of said first container and from the closure body of said closure and subsequently removing said closure body from said neck of said first container.

As described above, the closure ring prevents removal of the closure body from the container neck without first breaking to closure ring. Thus, if the closure ring remains intact when the returned container is received by the supplier, the supplier can infer that the closure has not been removed. Since the closure ring is separate to the closure body, the supplier may refit the same closure body to the refilled container, with only the closure ring needing to be replaced. Thus, in a preferred embodiment, the closure body is retained and reused with a new closure ring.

BRIEF DESCRIPTION OF DRAWINGS

Non-limiting embodiments of the invention will now be described, by way of example only, with reference to the accompanying drawings in which.

DETAILED DESCRIPTION

With reference to the FIGS. 1 to 9C, there is shown a system for distributing and dispensing liquids according to the present invention. The system comprises a plurality of reusable containers, each being arranged to be connected to a dispensing assembly to allow liquid within the containers to be dispensed. Each container of the present invention is identical and thus each container may be used interchangeably with any dispensing assembly of a system according to the present invention. The dispensing assembly is intended to be installed at a user premises, allowing any one of the plurality of containers to be delivered to said user and connected to the dispensing assembly at his premises.

Figure 1:
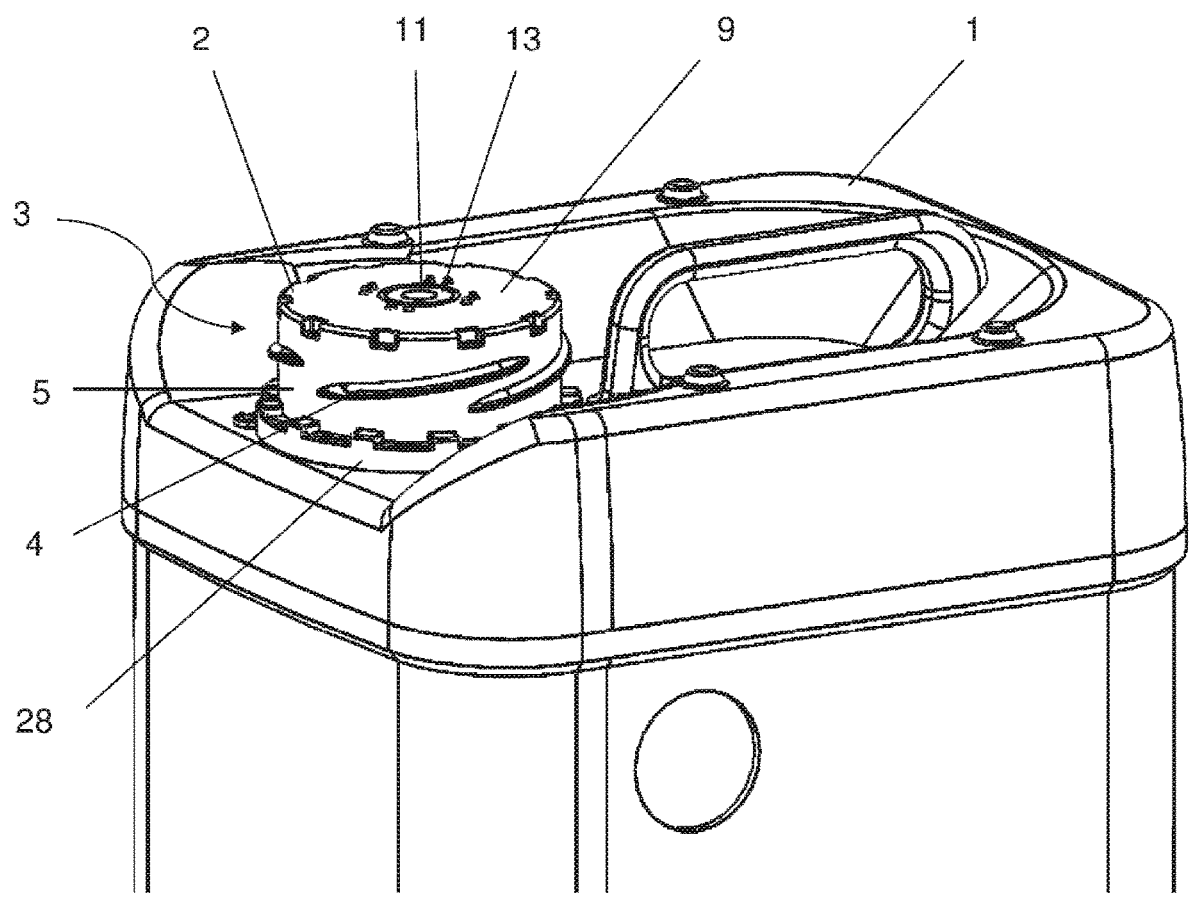
FIG. 1 is a perspective view of a container for use in a system in accordance with the present invention.

Referring to FIG. 1, there is shown a container 1 of a system according to the present invention. The container 1 comprises a closure 2, which engages with a neck 3 of the container by means of a screw thread. The closure 2 is arranged to seal an opening defined by the neck 3 of the container 1, so as to prevent liquid from exiting the container 1 through the opening, for example if the container 1 becomes sufficiently tilted or upended during storage or transport. That is to say, the closure 2 forms a stand-alone cap to seal the opening of the container neck 3. In alternative embodiments of the present invention, the container 1 may comprise an additional over-cap (not shown) arranged to be placed over the closure 2 and to engage with the closure 2 by means of a screw thread 4 provided on an annular wall 5 of the closure 2. Any such over-cap is preferably tethered to the container 1, such that it cannot be misplaced when removed from the closure 1.

Figure 2:
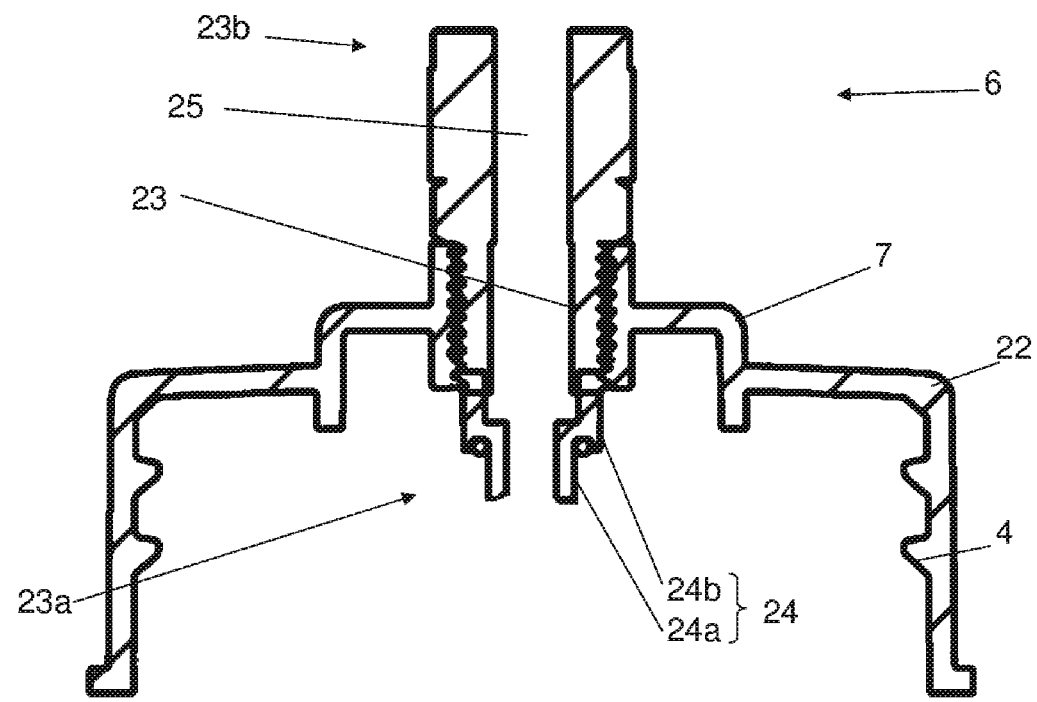
FIG. 2 is a cross section of the container of FIG. 1 and a connector of a dispensing assembly, wherein the connector is disengaged from a closure of the container.
Figure 2:
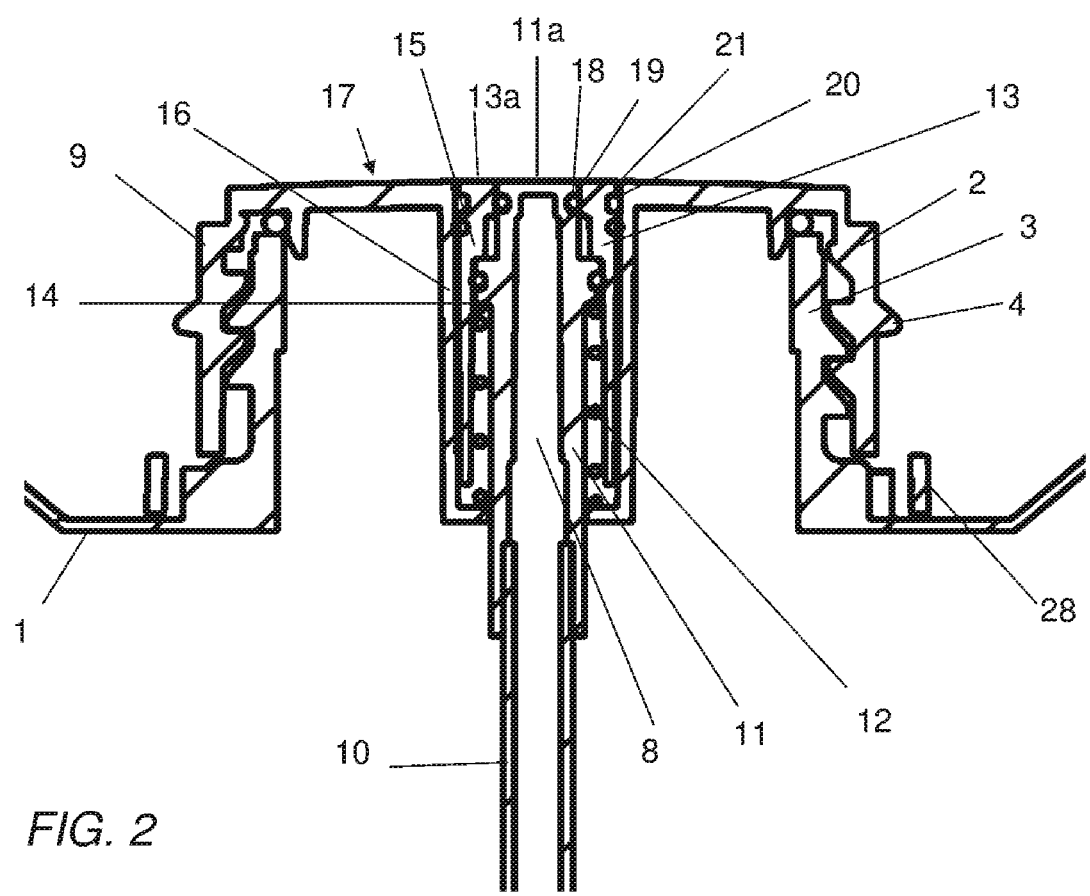

FIG. 2 shows in cross section the container 1 and a connector 7 of a dispensing assembly 6, which is disconnected from the closure 2. As shown, the closure 2 comprises a liquid flow passage 8 extending through a body 9 of the closure 2, which allows liquid to be drawn from the container 1 through the closure 2. A dip tube 10 is fluidly connected to the liquid flow passage 8 and extends into the container 1. In some embodiments of the present invention, the dip tube 10 may form the liquid flow passage 8. That is, the dip tube 10 may be formed unitarily with the liquid flow passage 8 extending through the closure body 9, such that the liquid flow passage 8 defines a dip tube extending into the container 1 to enable liquid to be drawn from the container 1.

The liquid flow passage 8 comprises a liquid valve 11, which is biased to a closed position by a spring 12. When in the closed position, as shown in FIG. 2, the liquid flow passage 8 is closed such that liquid, or any other fluid, is prevented from entering or exiting the container via the liquid flow passage 8. The liquid valve 11 is housed within a vent valve 13, which is also biased to a closed position by the spring 12. The liquid valve 11 comprises a flange 14 which is arranged to engage with a stepped portion 15 of the vent valve 13. The spring 12 exerts an upward force on the flange 14 of the liquid valve 11 so as to urge the liquid valve 11 into the closed position, and the flange 14 of the liquid valve 11 in turn exerts an upward force on the stepped portion 15 of the vent valve 13 so as to urge the vent valve 13 into the closed position. The closure body 9 comprises a substantially cylindrical valve housing 16 extending inwardly from an upper surface 17 of the closure body 9, in which the vent valve 13 and the liquid valve 11 are housed.

The liquid valve 11 comprises a seal 18, which engages with an inner surface 19 of the vent valve 13 when in the closed position, so as to prevent liquid or other fluid from passing between the liquid valve 11 and the inner surface 19 of the vent valve 13 when the liquid valve 11 is in the closed position. Likewise, the vent valve 13 comprises a seal 20, which engages with an inner surface 21 of the valve housing 16, so as to prevent liquid or other fluid from passing between the vent valve 13 and the inner surface 21 of the valve housing 16 when the vent valve 13 is in the closed position. Accordingly, when the valves 11, 13 are in the closed position, the closure 2 provides a continuous barrier sealing the opening defined by the neck 3 of the container 1, so as to prevent the ingress or egress of liquid from the container 1. In the embodiments shown, the liquid valve 11 and the vent valve 13 each comprise a substantially planar upper surface 11a, 13a, which upper surfaces 11a, 13a are substantially flush with the upper surface 17 of the closure body 9 when the valves 11, 13 are in the closed position. Accordingly, no wells or recesses are formed in the upper surface of the closure 2 when the valves 11, 13 are closed, preventing any residual liquid from collecting in any such wells or recesses. According to this arrangement, the closure 2 provides a stand-alone cap for the container 1, which seals the container 1 without the need for any other over-cap.

As shown in FIG. 2, the connector 7 of the dispensing assembly 6 comprises a connecting cap 22 arranged to engage with the annular wall 5 of the closure 2 by means of cooperating screw threads 4 provided on the closure 2 and the connector cap 22, so as to connect the connector 7 to the closure 2. The connector 7 further comprises a duct 23 defining a flow passage 25 through the cap 22, which duct 23 is arranged to engage with the liquid flow passage 8 of the closure 2 at a first end 23a of the duct 23 and to engage with the dispensing tube (not shown) at a second end 23b of the duct 23, so as to fluidly connect the liquid flow passage 8 of the closure 2 with the dispensing tube. The duct 23 comprises a lower wall 24 having a stepped configuration, wherein a distal portion 24a of the lower wall 24 has a reduced diameter relative to a proximal portion 24b of the lower wall 24. The stepped configuration of the lower wall 24 of the duct 23 provides a means to move the liquid valve 11 and the vent valve 13 into the open configuration when the connector 7 is connected to the closure 2, as described with reference to FIG. 3.

Figure 3:
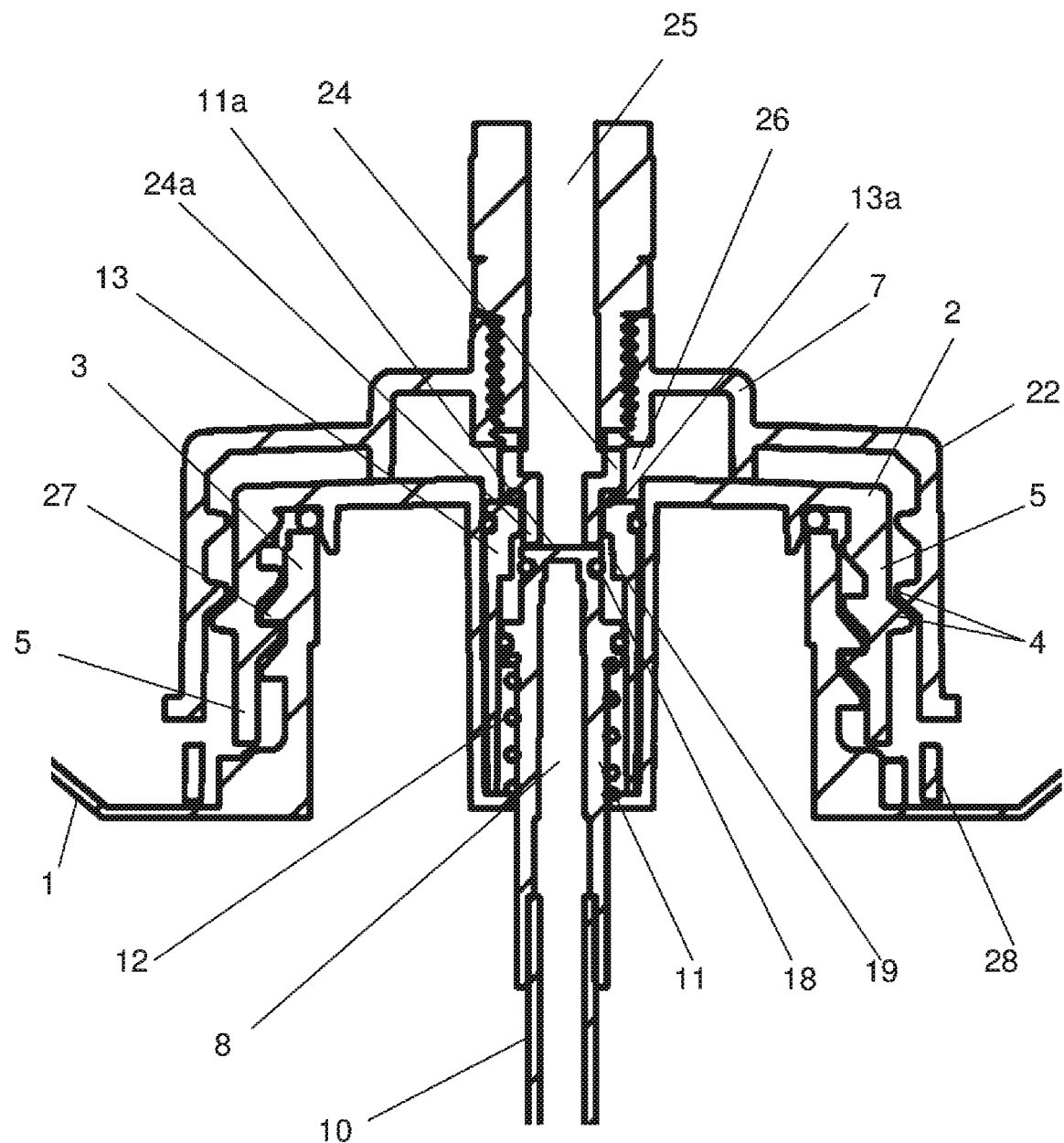
FIG. 3 is a cross-section of the container and connector of FIG. 2, wherein the connector is engaged with the closure.

FIG. 3 shows the container 1 in cross section, where the connector 7 of the dispensing assembly 6 is connected to the closure 2. The connector cap 22 is engaged with the annular wall 5 of the closure 2 by means of the cooperating screw threads 4. The distal portion 24a of the lower wall 24 of the duct 23 engages with the upper surface 11a of the liquid valve 11, so as to urge the liquid valve 11 downwardly into the open position. When in the open position, the seal 18 of the liquid valve 11 disengages from the inner surface 19 of the vent valve 13, such that liquid is able to pass between the liquid valve 11 and the vent valve 13. Apertures (not shown) are provided within the liquid valve 11 and the lower wall 24 of the duct 23, which provide a flow path between the liquid flow passage 8 of the closure 2 and the flow passage 25 defined by the duct 23. Therefore, when the liquid valve 11 is in the open position, liquid can be drawn from the container 1 through the dip tube 10 and the liquid flow passage 8 into the duct 23, and subsequently into the dispensing tube (not shown).

When the connector 7 is connected to the closure 2, the stepped portion of the lower wall 24 of the duct 23 engages with the upper surface 13a of the vent valve 13 and urges the vent valve 13 downwardly relative to the valve housing 16 into the open position. A gap 26 is thereby opened up between the vent valve 13 and the valve housing 16, which allows the passage of air into the container 1 through one or more apertures in the valve housing 16 (not shown), thus allowing the container 1 to vent.

As described above, the configuration of the liquid valve 11 and the vent valve 13 allow the container 1 to remain completely sealed when the closure 2 is engaged with the container neck 3, and to be opened by engaging the connector 7 with the closure 2, so as to allow liquid to be withdrawn from the container 1, and for the container 1 to be vented, without needing to remove the closure 2 from the container neck 3. Thus, the user does not need to remove the closure 2 from the container neck 3 in order to dispense or otherwise access the liquid within the container 1.

As shown in FIG. 3, the closure body 9 comprises an annular wall 5 arranged to engage with the container neck 3 by means of a screw thread 27, so as to seal an opening defined by the container neck 3 as described above. The closure 2 further comprises a closure ring 28 (shown most clearly in FIG. 1), which is separate from and unattached to the closure body 9. The closure ring 28 is arranged to engage with both the closure body 9 and the container neck 3 in a manner which prevents the closure body 9 from being removed from the container neck 3 without the integrity of the closure ring 28 being first destroyed. That is to say, in order to remove the closure body 9 from the container neck 3, the closure ring 28 must first be broken so as to disengage the closure ring 28 from the container neck 3 and/or the closure body 9.

Figure 4:
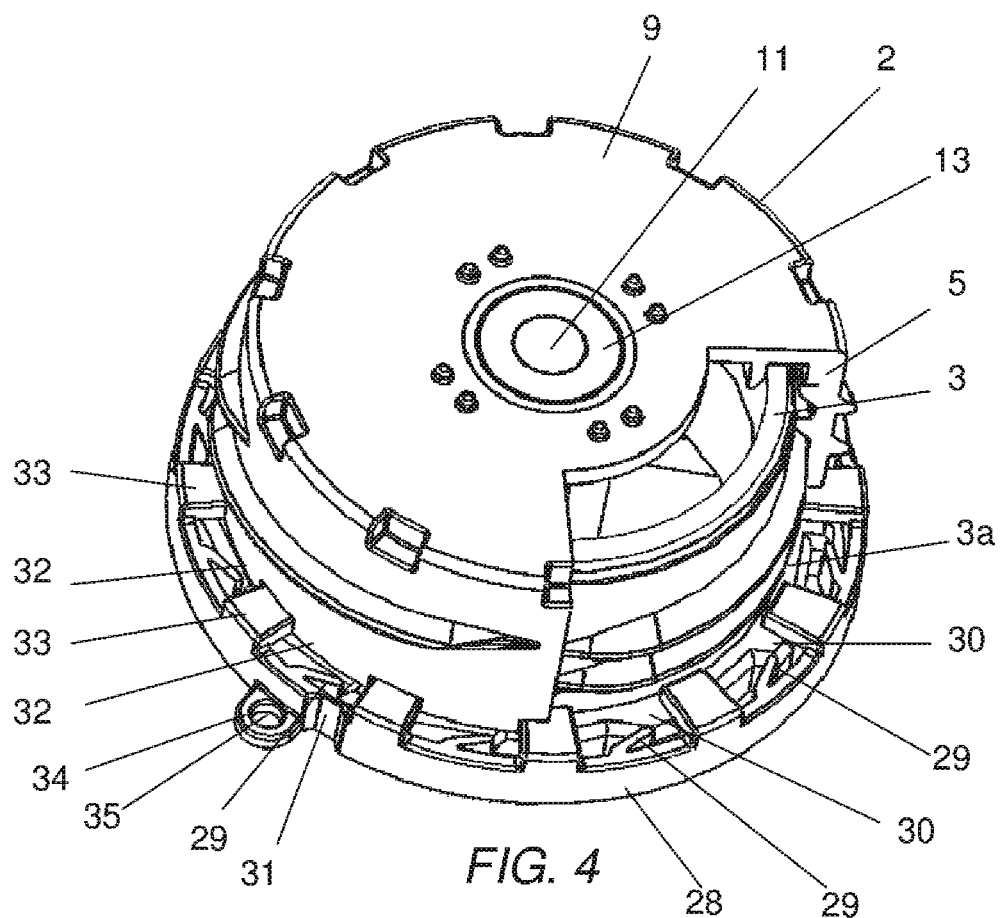
FIG. 4 is a perspective view of the closure of the container of FIG. 1, wherein a section of the closure it cutaway.
Figure 5:
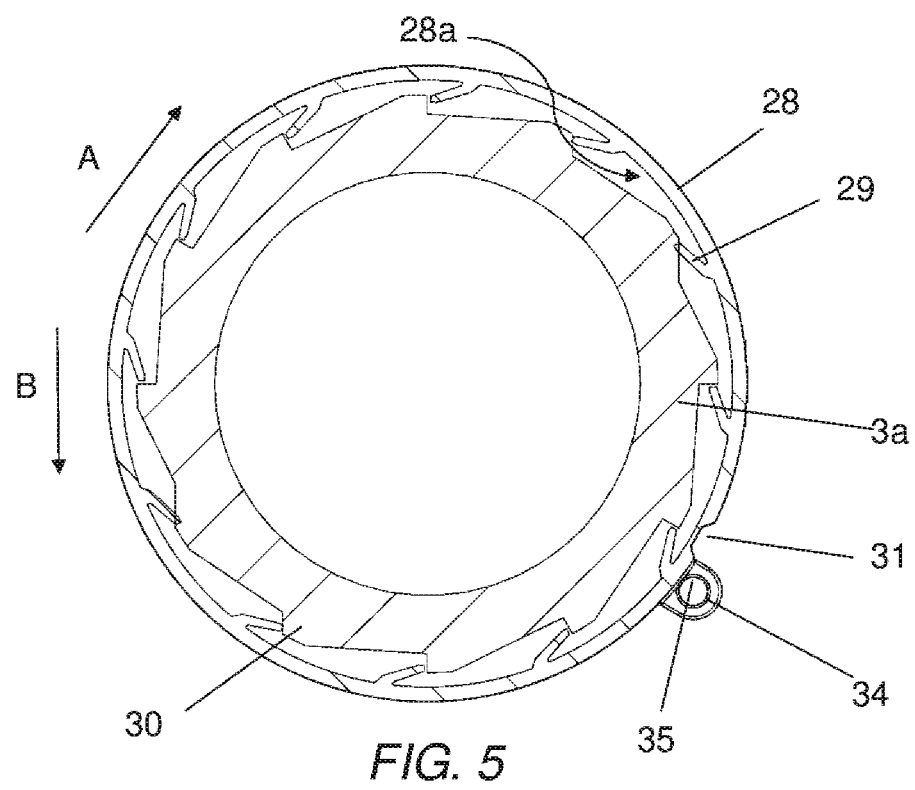
FIG. 5 is a cross section of the neck of the container of FIG. 1.
Figure 6A:
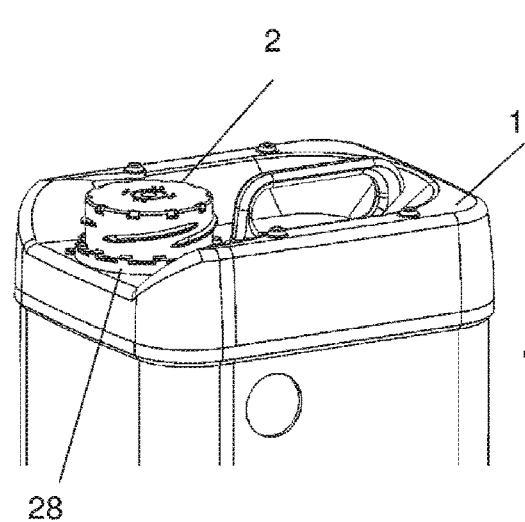
FIGS. 6A to 6D are schematic diagrams showing the disengagement of the closure from the container neck.
Figure 6B:
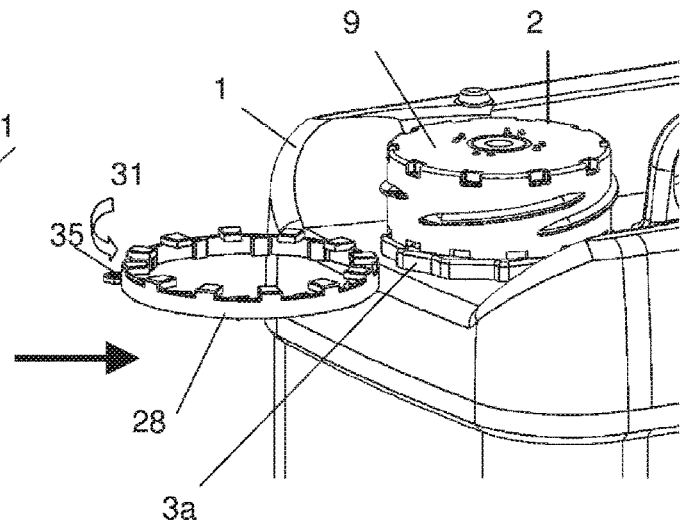
Figure 6D:
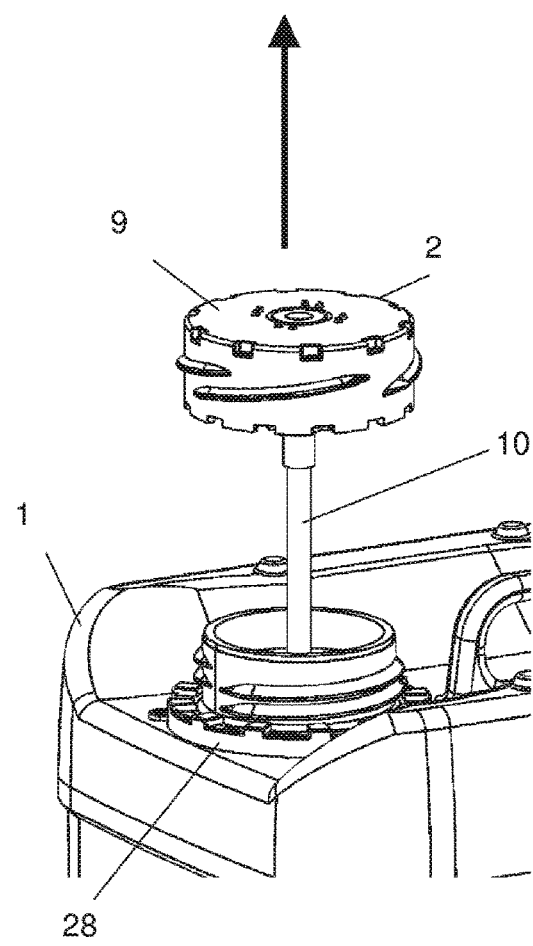
Figure 6C:
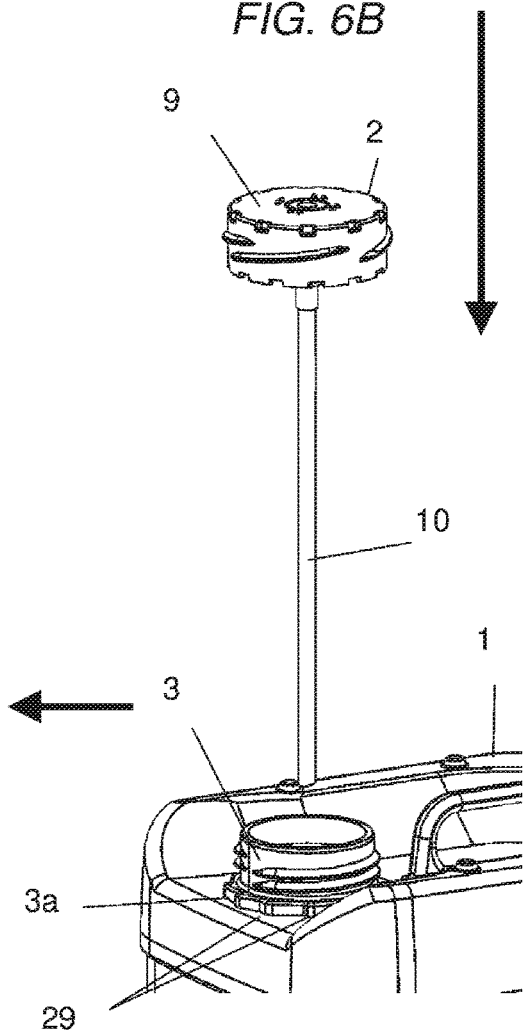

FIG. 4 shows the closure 2 engaged with the container neck 3, with a section of the closure body 9 being cut away, exposing a section of the container neck 3. In order to engage the closure ring 28 with the container neck 3, the closure ring 28 comprises a first set of engagement means in the form of a plurality of resilient tabs 29 provided on an inner surface of the closure ring 28. The container neck 3 is provided with a second set of engagement means in the form of a plurality of projections 30 provided at the base 3a of the container neck 3, and being arranged to engage with the resilient tabs 29 of the closure ring 28 to form a ratchet mechanism. The cooperating engagement means of the closure ring 28 and the container neck 3 are shown more clearly in FIG. 5, which is a cross section of the base 3a of the container neck 3 with the closure ring 28 placed around the container neck 3. As can be seen, when the closure ring 28 is placed around the container neck 3, the closure ring 28 is permitted to rotate around the base 3a of the container neck 3 in a first rotational direction A by deformation of the resilient tabs 29. However, movement of the closure ring 28 in a second rotational direction B is restricted, which second rotational direction B opposes the first rotational direction A. Rotation of the closure ring 28 in the second rotational direction B causes ends of the resilient tabs 29 to abut the protrusions 30, thus preventing rotation in the second rotational direction B. If the closure ring 28 is rotated in the second rotational direction B with sufficient force, the closure ring 28 will be destroyed by breaking one or more of the resilient tabs 29 and/or by breaking the closure ring 28 at a predefined point of weakness 31 provided around the circumference of the closure ring 28.

Referring again to FIG. 4, the closure ring 28 is arranged to engage with the closure body 9 by means of a plurality of teeth 32 provided on a lower edge of the annular wall 5, and a plurality of teeth 33 provided on an upper edge of the closure ring 28. Teeth 33 of the closure ring 28 are received within recesses formed between teeth 32 of the closure body 9. Likewise, teeth 32 of the closure body 9 are received within recesses formed between the teeth 33 of the closure ring 28. When the closure ring 28 is engaged with the closure body 9, rotation of the closure body 9 thereby causes a concurrent rotation of the closure ring 28 in the same direction. When the closure ring 28 is engaged with both the closure body 9 and the container neck 3, rotation of the closure body 9 in the first rotational direction A is therefore permitted, whereas rotation of the closure body 9 in the second rotational direction B is restricted due to the restriction of the movement of the closure ring 28 in the second rotational direction B. The first rotational direction A corresponds to a direction in which the closure body 9 is tightened onto the container neck 3 by means of the screw thread 27. Accordingly, the closure body 9 can be placed on the container neck 3 and tightened onto the container neck 3 until fully engaged. However, the closure body 9 cannot be subsequently removed from the container neck 3 by rotating in the opposite direction, unless the closure ring 28 is first removed.

In order to facilitate removal of the closure 2 from the container 1 by a supplier, the closure ring 28 comprises a protrusion 34 adjacent the predefined weakness 31, which protrusion 34 is arranged to protrude outwardly from the container neck 3. The protrusion 34 may be pulled so as to break the closure ring 28 at the predefined point of the weakness 31, which releases the closure ring 28 from the container neck 3 and from the closure body 9. Rotation of the closure body 9 in the second rotational direction B is thus no longer restricted, allowing the closure body 9 to be subsequently removed from the container neck 3 by rotating the closure body 9 in the second rotational direction B. The protrusion 34 comprises a loop 35, into which a hook or a rod of a machine part or tool may be inserted to facilitate removal of the closure ring 28.

The arrangement of the closure 2 as described above makes it possible for the supplier to determine whether or not the closure has been removed from the container neck 3. That is to say, the closure 2 is a tamper-evident closure. Removal of the closure 2 from the container neck 3 by the user is not impossible, however in order to do so the closure ring 28 must first be broken, and thus removal of the closure 2 will be evident to the supplier when the container 1 is returned. If the container 1 is returned with the closure ring 28 fully intact, the supplier can infer that the closure body 2 has not been removed from the container 1. Therefore, the supplier can also infer that the container 1 has not been filled with any liquid other than the liquid originally supplied with the container 1, or contaminated in any other way.

FIG. 6 illustrates the process by which the supplier may process the container 1 for reuse. FIG. 6A shows a container 1 which has been returned with the closure body 9 engaged with the container neck 3 and the closure ring 28 still intact. Therefore, the supplier can infer that no other liquids have been placed within the container 1. Thus, the supplier can refill the container 1 with the same liquid without needing to first wash or otherwise decontaminate the container 1. In order to do this, the closure ring 28 is released from the container neck 3 and the closure body 9 by pulling on the protrusion 35 so as to break the closure ring 28 at the predefined point of weakness 31, as illustrated in FIG. 6B. Once the closure ring 28 has been released, the closure body 9 can be unscrewed from the container neck 3, and the closure body 9 with attached dip tube 10 can be removed from the container 1, as shown in FIG. 6C. The container 1 can then be refilled with the same liquid. Finally, a new closure ring 28' is placed around the container neck 3 so as to engage with the protrusions 29 provided at the base 3a of the container neck 3, and subsequently the same dip tube 10 and closure body 9 can be inserted into the container 1 and engaged with the container neck 3 by screwing the closure body 9 onto the container neck 3 until the closure body 9 engages with the new closure ring 28', such that the closure body 9 cannot be removed from the container neck 3 without first breaking the new closure ring 28' (FIG. 6D). It will be appreciated that any identical closure body and dip tube may be refitted with the reused container 1. However, a significant advantage of the present invention is that only the closure ring needs to be replaced in order to reuse the container 1. Thus, the closure body 9 and dip tube 10 may be reused a large number of times.

Figure 7:
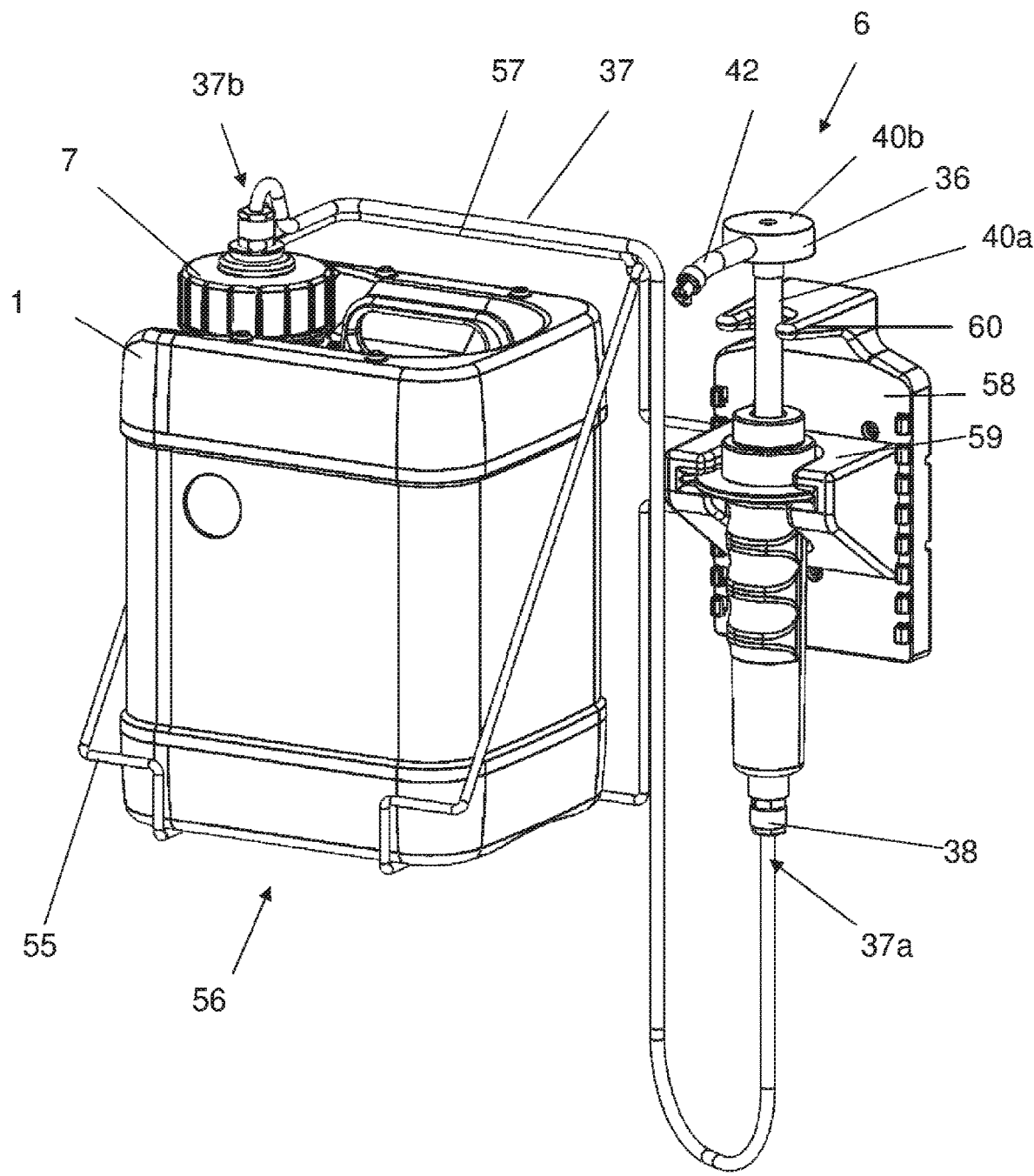
FIG. 7 is a perspective view of a system according to the present invention.

The dispensing assembly of the illustrated embodiment will now be described with reference to FIGS. 7 and 8A to 8C. FIG. 7 shows the container 1 connected to a dispensing assembly, indicated generally as 6, the dispensing assembly 6 comprising a dispensing pump 36, a dispensing tube 37 fluidly connected at a first end 37a to the dispensing pump 36, and the connector 7, as described hereinbefore, connected to a second end 37b of the dispensing tube 37. The connector 7 is arranged to fluidly connect the dispensing assembly 6 to container 1. The dispensing tube 37 is a flexible tube fluidly connected at the second end 37b to the duct 23 of the connector 7, and at the first end 37a to an inlet 38 of the dispensing pump 36. The provision of a flexible dispensing tube 37 allows the dispensing pump 36 to be moved relative to the container 1, and thus the location of the dispensing pump 36 need not be fixed. Accordingly, when dispensing liquid into an appropriate receptacle, the user need not move the receptacle to the fixed location of the dispensing pump 36, but may instead move the dispensing pump 36 to a convenient location of the receptacle, such as on the floor or on a work surface.

In the illustrated embodiment, the dispensing pump 36 is a hand-operated displacement pump. Specifically, the illustrated dispensing pump 36 is a so-called 'pelican' pump, as shown most clearly in FIGS. 8A and 8B, which show an upper portion of the pump 36 in cross-section. The dispensing pump 36 comprises a cylindrical chamber 39 arranged to be fluidly connected to the dispensing tube 37 at a first end 39a (as described in greater detail below with reference to FIG. 8C), and a piston 40 partially received within the chamber 39 through a second end 39b of the chamber 39. The piston 40 comprises a pump head 41 having a spout 42 and defines a channel 43 through which liquid is dispensed from the dispensing pump 36. The piston 40 further comprises a seal 44 arranged to engage with an inner wall 45 of the chamber. Reciprocal movement of the piston 40 within the chamber 39 from a raised position (FIG. 8A) to a lowered position (FIG. 8B) by pressing on the pump head 41 causes liquid within the chamber 39 to be dispensed through the spout 42 of the pump head 41.

The chamber 39 is arranged to be held by a user to allow the dispensing pump 36 to be moved relative to the container 1. A hand grip 46 is therefore provided on an outer surface 47 of the chamber 39 to facilitate handling of the pump 36 by the user. A portion of the hand grip 46 is contoured to accommodate fingers of a user holding the pump 36 by the hand grip 46. The hand grip 46 not only provides an ergonomic and comfortable grip by which the user can hold the pump 36, but also provides a visual indication to the user that the pump 36 is intended to be handled. Thus, a user unfamiliar with the system according to the present invention may be intuitively aware of the intended mode of operation. This may then prevent a user from attempting to hold a receptacle in an awkward, or even hazardous, position when dispensing liquid into the receptacle.

The pump 36 further comprises a hand-shield 48, which comprises a flange provided on the outer surface 47 of the chamber 39 at or near the upper end 39*b* of the chamber 39. In the illustrated embodiment, the hand-shield 48 is formed unitarily with the hand grip 46, however in alternative embodiments the hand-shield 48 may be a separate component. The hand-shield 48 at least partially protects a user's hand from residual liquid when handling the displacement pump 36 and dispensing liquid.

The system incorporates an anti-syphon mechanism which prevents liquid from draining out from the container 1 through the dispensing tube 37 when the dispensing pump 36 is left in a position lower than the level of liquid within the container 1. This anti syphon mechanism may be achieved by individual use of one valve, a combination of one or more valves or use of all three valve systems.

Figure 8A:
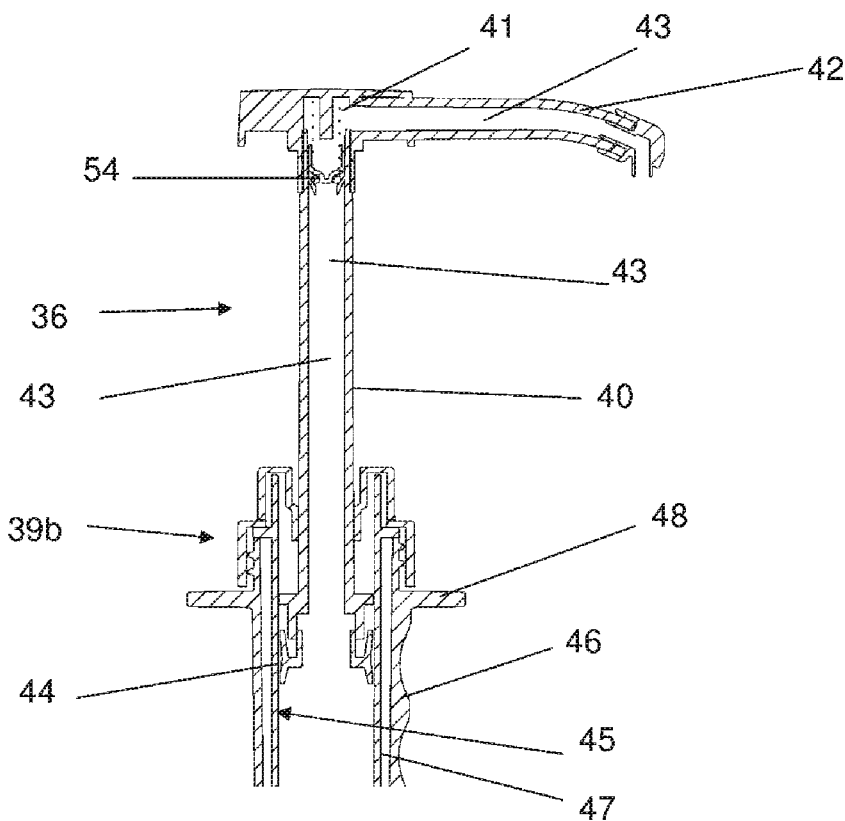
FIGS. 8A to 8C are cross sections of a dispensing pump for use in a system according to the present invention.
Figure 8B:
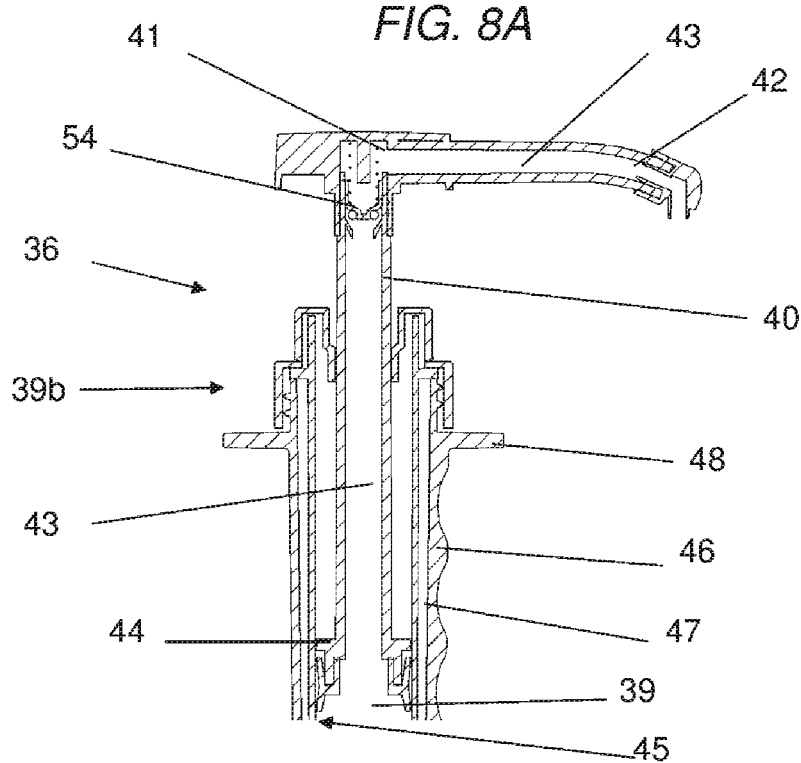
Figure 8C:
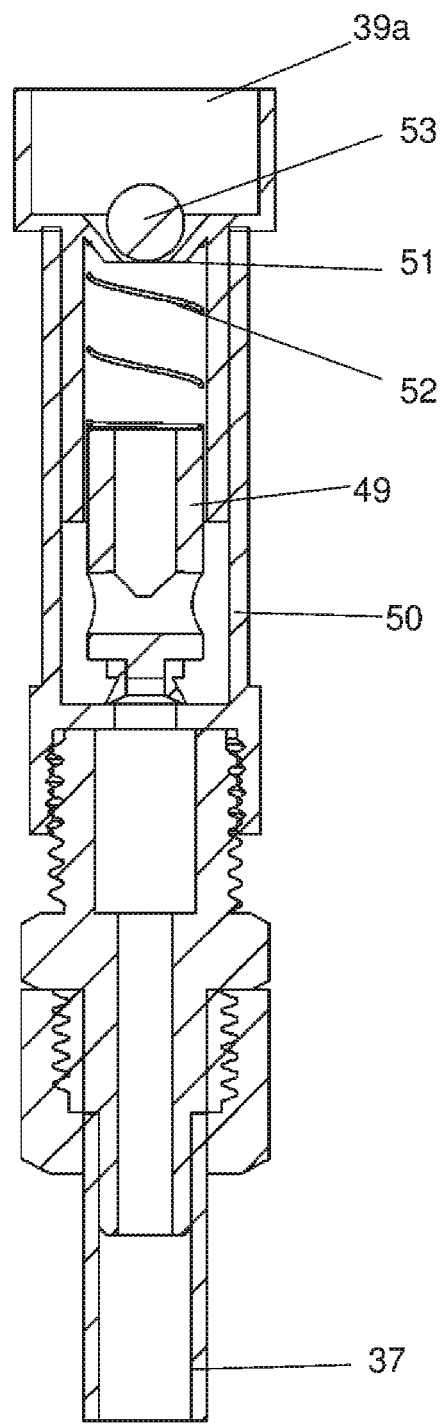

As shown in FIG. 8C, the pump 36 illustrates an anti-syphon valve 49, which is provided in a connecting portion 50 of the dispensing pump 36, which is arranged to fluidly connect the dispensing tube 37 to an inlet 51 provided at the first end 39*a* of the chamber 39. The anti-syphon valve 49 is a first non-return valve of the dispensing pump 36. The anti-syphon valve 49 is biased to a closed position by a spring 52, in which closed position the flow of liquid in an upstream direction from the dispensing tube 37 to the chamber 39 of the dispensing pump 36 is prevented. The anti-syphon valve 49 prevents liquid from draining out from the container 1 through the dispensing tube 37 when the dispensing pump 36 is left in a position lower than the level of liquid within the container 1.

The dispensing pump can optionally comprise a second non-return valve 53 positioned upstream of the anti-syphon valve 49, the second non-return valve 53 being arranged to permit the flow of liquid through the dispensing pump 36 in an upstream direction and to prevent the flow of liquid in a downstream direction from the dispensing pump 36 to the dispensing tube 37. Furthermore, the dispensing pump 36 can optionally comprise a third non-return valve 54 (FIGS. 8A and 8B) provided within the pump head 41, which is arranged to permit the flow of liquid through the channel 43 in an upstream direction, and to prevent the flow of liquid or air in a downstream direction through the channel 43. This arrangement of non-return valve allows liquid to be displaced from the chamber 39 and dispensed through the spout 42 when the piston 40 is pressed downwards into the chamber 39, and allows liquid to subsequently be drawn into the chamber 39 from the container 1 through the dispensing tube 37 when the piston 40 is subsequently raised, due to the reduced pressure created within the chamber 39 when the piston 40 is raised.

Figure 9A:
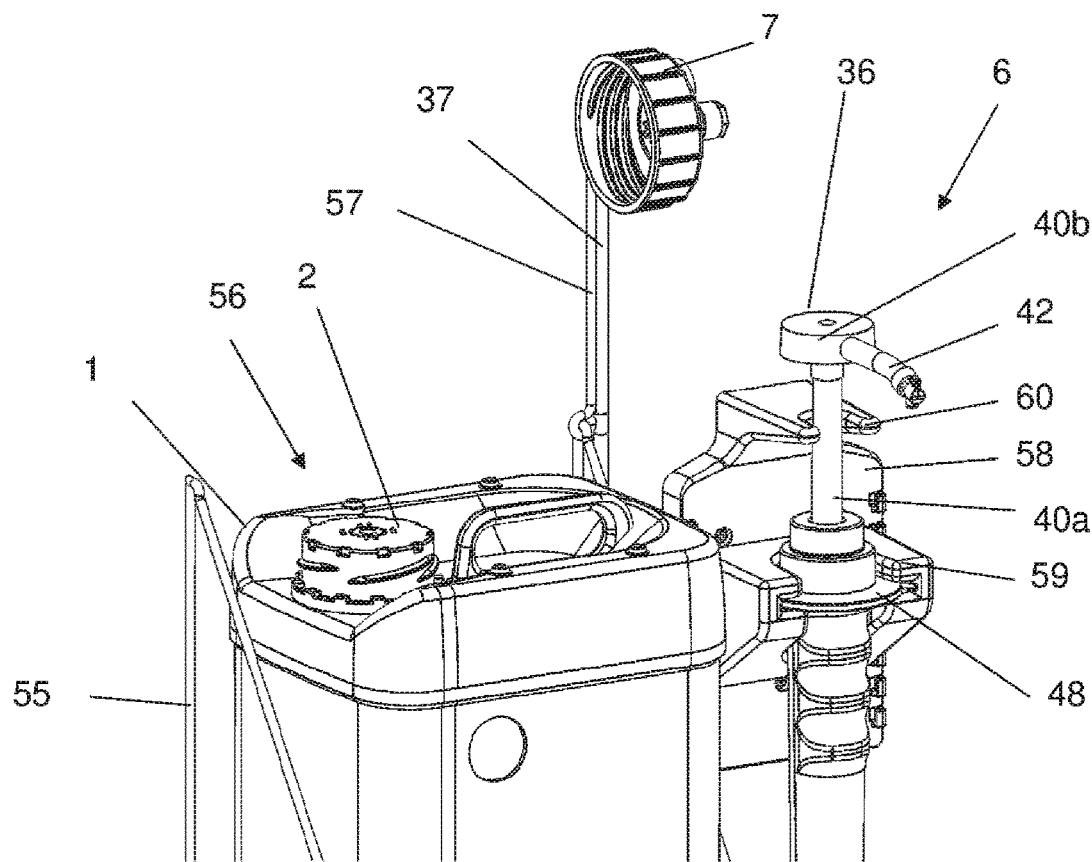
FIGS. 9A to 9C are schematic diagrams illustrating the use of a frame assembly in a system according to the present invention.
Figure 9B:
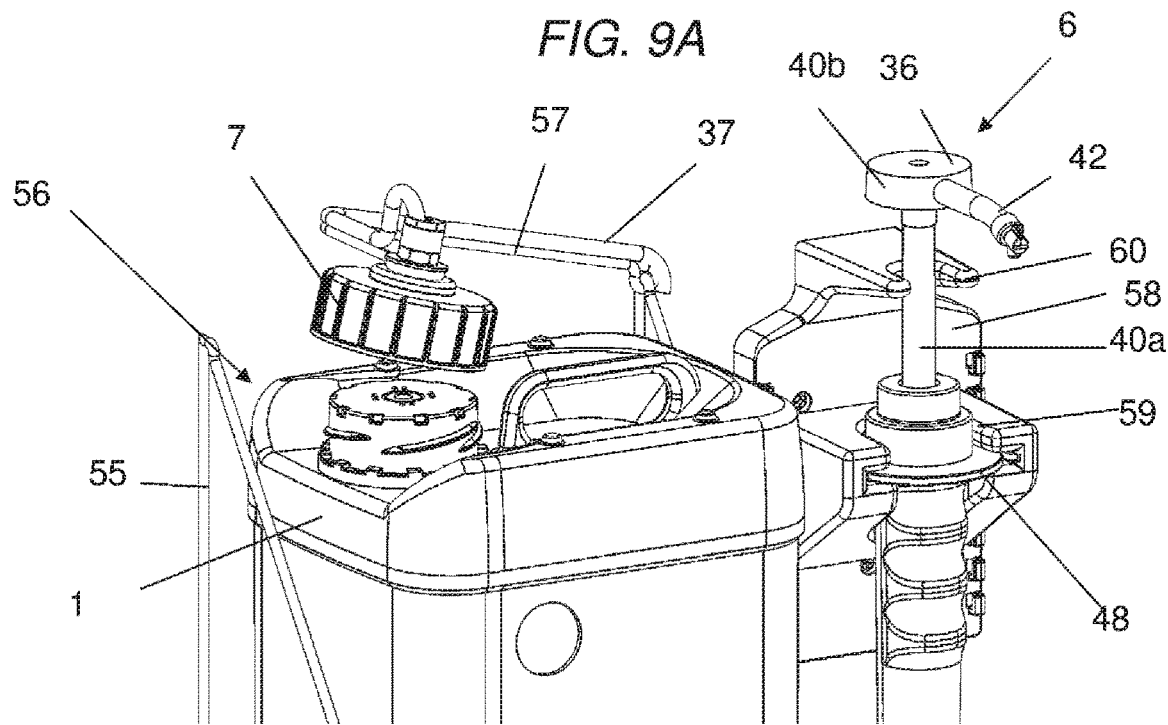
Figure 9C:
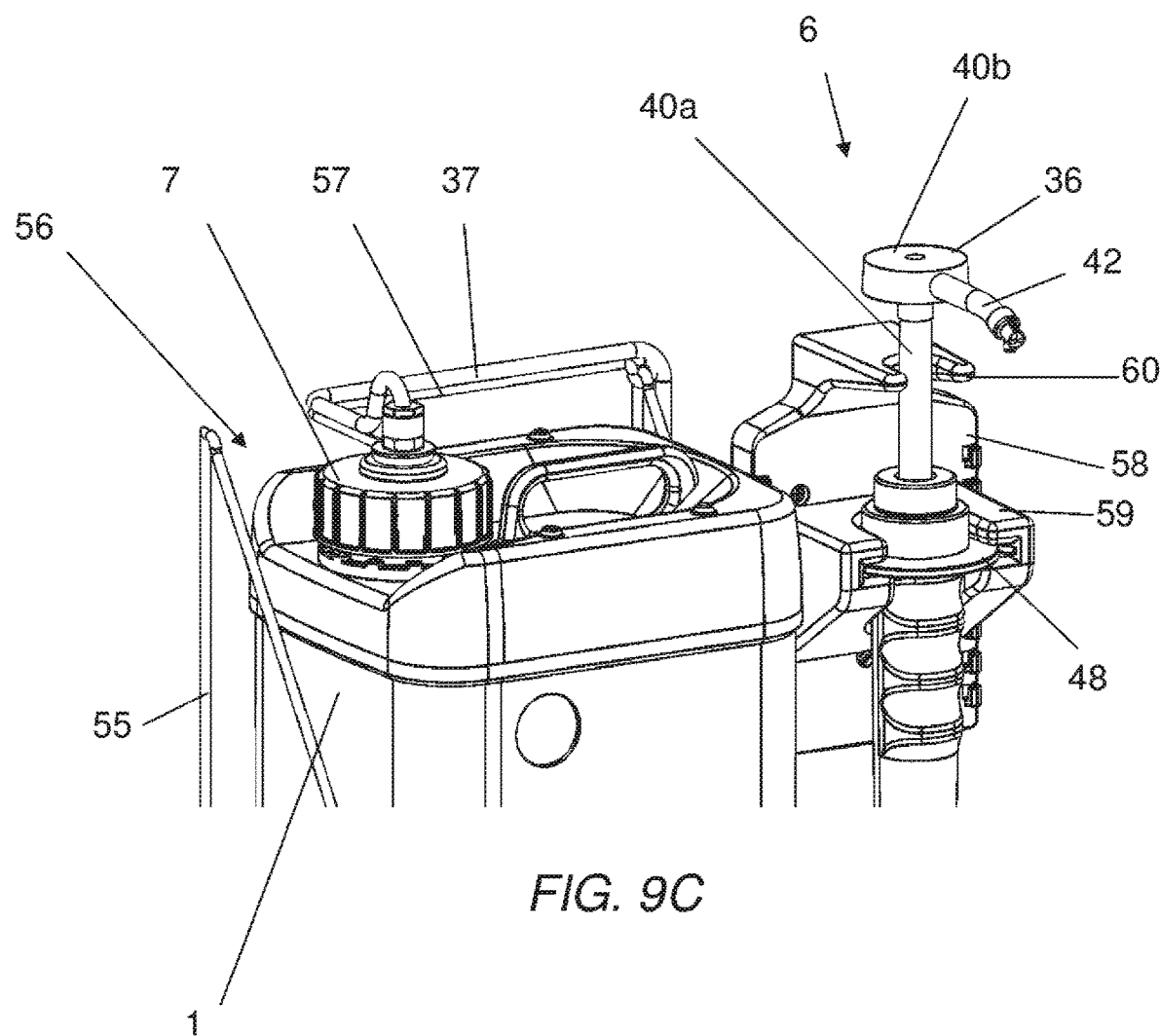

Referring again to FIG. 7, the system further comprises a frame assembly 55, which frame assembly 55 comprises an enclosure 56 arranged to accommodate the container 1 in a fixed position and orientation. The frame assembly 55 further comprises a pivotable arm 57 to which the connector 7 of the dispensing assembly is attached. FIGS. 9A to 9C show the operation of the pivotable arm 57 in greater detail.

As shown in FIG. 9A, the pivotable arm 57 can be placed in a raised positon where the connector 7 is not connected to the closure 2, and wherein the dispensing tube 37 is arranged such that when the connector 7 is in the raised position, liquid in the dispensing tube 37 will not be able to drain out through the duct 23 of the connector 7. The pivotable arm 57 may be held in the raised position by a clip or any other appropriate retaining mechanism (not shown). To install a new container 1, the container 1 is placed within the enclosure 56 and the pivotable arm 57 is lowered (FIG. 9B). The connector 7 is then connected to the closure 2 (FIG. 9C), so as to fluidly connect the container 1 to the dispensing assembly 6 as described above.

As shown in FIG. 7, the frame assembly 55 further comprises a cradle 58 for releasably mounting the dispensing pump 36. The cradle 58 comprises a dock 59 arranged to accommodate the hand-shield 48 of the pump 36. The cradle 58 is physically connected to the frame assembly 55, such that the cradle 58 is positioned at a fixed height relative to the enclosure 56 of the frame assembly 55, and thus at a fixed height relative to the container 1 held within the enclosure 56.

The cradle 58 comprises a stop 60 arranged to restrict movement of the piston 40 when the dispensing pump 36 is mounted within the cradle 58. The stop 60 comprises an opening large enough to accommodate a neck 40*a* of the piston 40 and to allow reciprocal movement of the piston 40 within the cradle 58. However, the opening is smaller than an elbow 40*b* connecting the piston neck 40*a* to the spout 42. Accordingly, movement of the piston 40 is restricted by the elbow 40*b* abutting the stop 60. The position of the stop 60 relative to the piston 40 can be selected so as to allow a predetermined volume of liquid to be dispensed from the pump 36 when the pump 36 is mounted within the cradle 58, by limiting the vertical displacement of the piston 40 within the chamber 39 of the pump 36. The predetermined volume will be relatively small compared to the maximum dispensing volume of the pump 36 when not mounted within the cradle 58. The pump 36 can therefore be operated when mounted within the cradle 58 and can be used to dispense a small predetermined volume of liquid into a relatively small hand-held receptacle such as a trigger-spray bottle.

Figure 10:
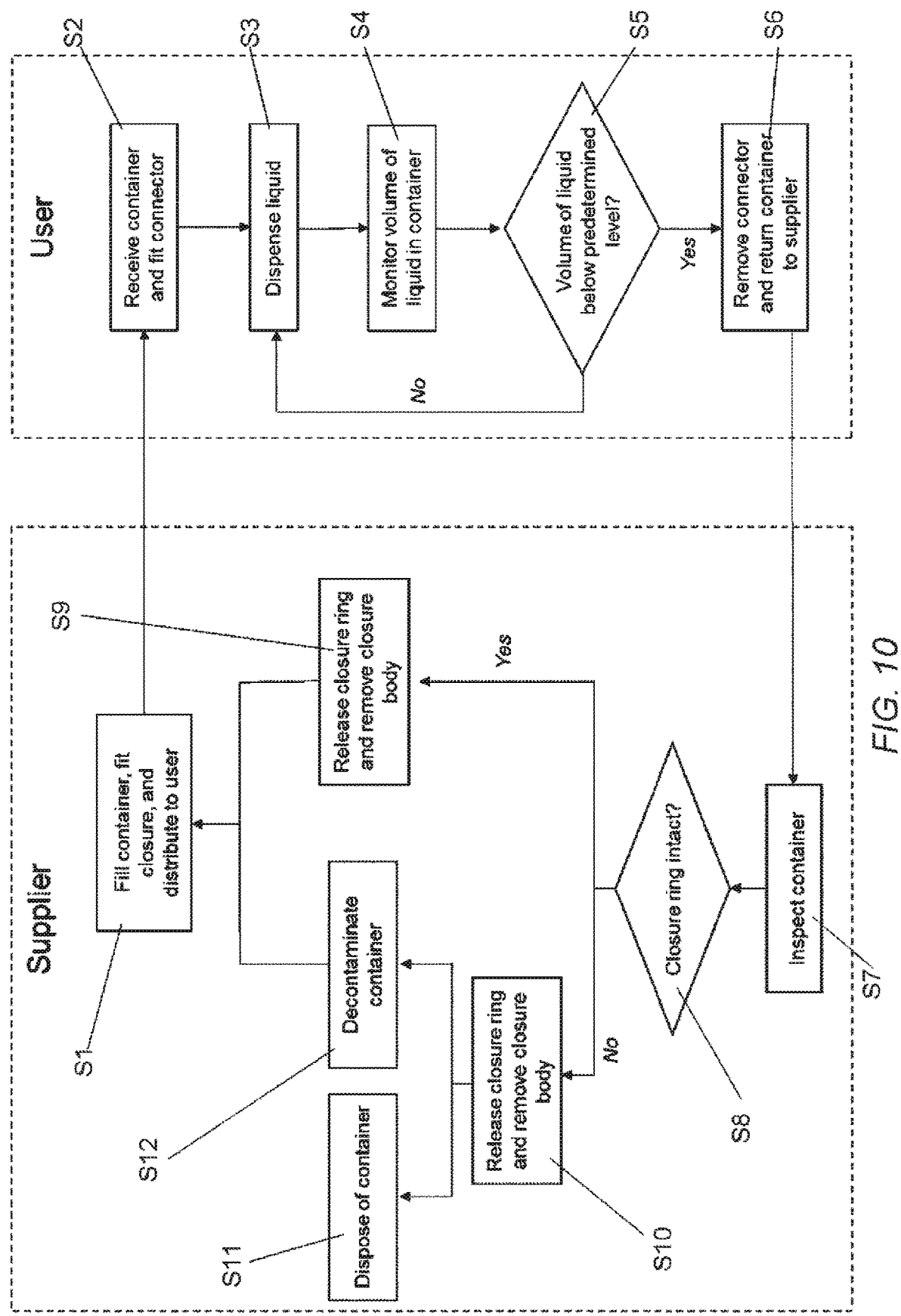
FIG. 10 is a schematic diagram illustrating a method for dispensing and distributing chemicals according to the present invention.

With reference to FIG. 10, there is shown a method of distributing and dispensing liquids using the system as hereinbefore described. In a first step (S1), the supplier fills one of the containers of the system with a particular liquid to be distributed to a user. The closure is fitted to the neck of the container with the dip tube connected to the liquid flow passage of the closure and extending into the container. The closure is fitted such that the closure ring is engaged with both the closure body and the container neck. Accordingly, the closure body cannot be subsequently removed from the container neck without destroying the integrity of the closure ring in a manner which prevents the closure ring from being reused. Once the closure is fitted to the container neck so as to seal the opening of the container, the container is distributed to a user. The supplier may simultaneously fill a plurality of containers with the same liquid, and may distribute these to the same user or a plurality of users.

Upon receipt of the container, the user installs the container within a dispensing assembly located at their premises by fitting the connector of the dispensing assembly to the closure of the container (S2). The user then dispenses liquid from the container using the dispensing pump as described in detail above (S3). Whilst the container is in use by the user, the volume of liquid within the container is continuously or continually monitored (S4). Any appropriate means for monitoring the volume of liquid within a container may be employed. In the illustrated embodiment, the volume of liquid is monitored by the user, however in alternative embodiments, the supplier may remotely monitor the volume of liquid within the container in order to distribute a new, filled container to the user before the first container has been emptied.

During the use of the container by the user, it is continuously or continually determined whether or not the volume of liquid within the container is below a predetermined level (S5). The predetermined level is indicative of the container being empty or nearly empty. If the volume of liquid is not below the predetermined level, the user continues to dispense liquid from the container (S3). If the volume of liquid is determined to be below the predetermined level, the container is removed from the dispensing assembly by removing the connector from the closure, and the container is returned to the supplier (S6).

Upon receipt of the returned container, the supplier first carries out an inspection of the container to determine whether or not the closure has been removed by the user at any time whilst the container has been in the possession of the user (S7). The inspection comprises determining whether or not the closure ring is intact (S8). If the closure ring is intact, the supplier can infer that the closure has not been removed by the user and, therefore, that the container has not been filled with any other liquid whilst in the user's possession. The supplier thus destroys the closure ring by breaking at the predefined line of weakness in the circumference of the closure ring, so as to disengage the closure ring from the container neck and the closure body (S9). The closure body is then removed (S9), before the container is refilled with the same liquid fitted with a new closure (S1), which new closure comprises the same or an identical closure body and a new closure ring. The entire process can then be repeated by distributing the container to the same or another user.

If, at step S8, it is determined that the closure is not fully intact, the supplier may infer that the closure has been removed by the user, or at least that an attempt to remove the closure has been made. In such circumstances, the supplier cannot be certain that the container has only be used for the storage of the particular liquid with which it was originally supplied, or that the container has not been contaminated in some other way. That is to say, it is possible that the container has been filled with another liquid or has otherwise been contaminated. In such circumstances, the supplier released the closure ring and removed the closure body (S10), and then may decide to dispose of the container entirely (S11), or preferably decontaminate (S12) the container by washing, rinsing or otherwise removing residual liquid from the container, before refilling the container for subsequent reuse (S1).

The invention has been described above with reference to specific embodiments, given by way of example only. It will be appreciated that different arrangements of the system are possible, which fall within the scope of the appended claims.

The invention claimed is:

1. A system for distributing and dispensing liquids, the system comprising:
    a plurality of re-usable containers, each container of the plurality of re-usable containers comprising:
        a removable closure arranged to engage with a neck of the container, the removable closure comprising a liquid flow passage extending through the removable closure; and
        a dip tube fluidly connected to or forming the liquid flow passage of the removable closure and extending into the container,
    the system further comprising a dispensing assembly comprising:
        a dispensing tube for receiving liquid from the container; and
        a connector arranged to releasably engage with the removable closure so as to fluidly connect the dispensing tube to the liquid flow passage of the removable closure,
    wherein the removable closure is tamper-evident in character, being arranged to deter or prevent removal of the removable closure by an unauthorised person,
    the removable closure comprising a closure body arranged to engage with the neck of the container so as to seal an opening of said container; and
    a closure ring separate from and not attached to the closure body;
    wherein the closure ring is arranged to engage with both the closure body and the neck of the container so as to prevent the closure body from being removed from the neck of the container until the integrity of the closure ring has been destroyed in a manner that prevents the closure ring from being reused;
    wherein the closure body comprises an annular wall arranged to engage with the neck of the container by means of a screw thread;
    wherein the closure ring comprises a first set of engagement means arranged to engage with a second set of engagement means provided around a circumference of the neck of the container at a base thereof; and
    wherein the first and second sets of engagement means form a ratchet mechanism when engaged with each other, so as to permit rotation of the closure ring in a first rotational direction, and to prevent rotation of the closure ring in a second rotational direction opposing the first rotational direction, the first rotational direction being a rotational direction in which the closure body is tightened onto the screw thread.

2. The system according to claim 1, wherein:
    the removable closure comprises a vent that includes a vent valve, which vent valve is moveable between an open position and a closed position, the vent valve being biased to the closed position; and
    the connector comprises means to move the vent valve from the closed position to the open position when the connector is engaged with the removable closure.

3. The system according to claim 1, wherein:
    the liquid flow passage comprises a liquid valve moveable between an open position and a closed position, the liquid valve being biased to the closed position; and
    the connector comprises means to move the liquid valve from the closed position to the open position when the connector is engaged with the removable closure.

4. The system according to claim 2, wherein:
    the liquid flow passage comprises a liquid valve moveable between an open position and a closed position, the liquid valve being biased to the closed position;
    the connector comprises means to move the liquid valve from the closed position to the open position when the connector is engaged with the removable closure;
    the liquid valve and the vent valve each comprise a substantially planar upper surface arranged to be substantially flush with an upper surface of the removable closure when biased to the closed position; and the upper surfaces of the liquid valve, the vent valve, and the removable closure form a substantially continuous barrier to prevent ingress or egress of liquid from the container when the liquid valve and the vent valve are in the closed position.

5. The system according to claim 1, wherein the closure ring comprises a predefined weakness provided at a point around a circumference of the closure ring.

6. The system according to claim 5, wherein the closure ring comprises a protrusion adjacent to the predefined weakness, the protrusion being arranged to protrude outwardly from neck of the container on which the closure ring is placed, so that the protrusion may be used to release the closure ring and permit the closure body to be subsequently removed from the neck of the container without damaging the closure body.

7. The system according to claim 1, wherein the closure body and the closure ring comprise a plurality of engaging teeth and/or recesses configured to engage the closure ring with the closure body.

8. A method of distributing and dispensing liquids using a system according to claim 1, the method comprising:
at a supplier end:
filling a first container of the plurality of re-usable containers with liquid to be distributed;
fitting a removable closure to the neck of said first container, with the dip tube fluidly connected to the liquid flow passage of the removable closure of said first container and extending into said first container; and
distributing said first container to a user;
at a user end:
receiving said first container distributed to the user;
connecting the connector of the dispensing assembly to the removable closure of said first container;
dispensing liquid from said first container;
when a volume of liquid within the first container has fallen to a predetermined level, disconnecting the connector from the closure of said first container;
replacing said first container with a second container of the plurality of re-usable containers received from said supplier; and
returning said first container to said supplier, and
at the supplier end:
receiving said first container returned by said user;
determining whether the tamper-evident closure has been removed from said first container, or whether an attempt has been made to remove the tamper-evident closure from said first container;
if it is determined that the tamper-evident closure has not been removed from said first container, or if it is determined that no attempt to remove the tamper-evident closure has been made, removing the tamper-evident closure from the neck of said first container and refilling said first container with a same liquid without first rinsing, washing or in any other way removing any residual liquid from within the container;
fitting the same tamper-evident or an identical removable tamper-evident closure to the neck of said first container with the dip tube fluidly connected to the liquid flow passage of the tamper-evident closure and extending into said first container; and
redistributing said first container to the same user or another user.

9. The method according to claim 8, wherein the method further comprises:
in the step of fitting the removable tamper-evident closure to the neck of said first container, in no particular order:
placing the closure ring of said closure around the neck of said first container, and fitting the closure body of said closure to the neck of said first container with the closure ring engaging with or engaged with the closure body; and
in the step of removing the tamper-evident closure, removing the closure ring from the neck of said first container in a manner which prevents the closure ring being reused, so as to disengage said closure ring from said neck of said first container and from the closure body of said closure and subsequently removing said closure body from said neck of said first container.

10. The method according to claim 9, wherein the closure body is retained and reused with a new closure ring.

* * * * *